(12) United States Patent
Kidokoro et al.

(10) Patent No.: US 10,711,678 B2
(45) Date of Patent: Jul. 14, 2020

(54) ABNORMALITY DIAGNOSIS DEVICE FOR REDUCING AGENT ADDING DEVICE

(71) Applicant: TOYOTA JIDOSHA KABUSHIKI KAISHA, Toyota-shi (JP)

(72) Inventors: Toru Kidokoro, Hadano (JP); Makoto Ogiso, Mishima (JP); Takeru Shirasawa, Susono (JP); Kenji Furui, Sunto-gun (JP); Kazuya Takaoka, Machida (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 26 days.

(21) Appl. No.: 16/218,669

(22) Filed: Dec. 13, 2018

(65) Prior Publication Data

US 2019/0186327 A1 Jun. 20, 2019

(30) Foreign Application Priority Data

Dec. 14, 2017 (JP) ................. 2017-239728

(51) Int. Cl.
*F01N 11/00* (2006.01)
*F01N 3/20* (2006.01)

(52) U.S. Cl.
CPC ............ *F01N 11/002* (2013.01); *F01N 3/206* (2013.01); *F01N 3/208* (2013.01); *F01N 11/00* (2013.01); *F01N 2550/05* (2013.01); *F01N 2610/02* (2013.01); *F01N 2900/0412* (2013.01); *F01N 2900/1822* (2013.01)

(58) Field of Classification Search
CPC combination set(s) only.
See application file for complete search history.

(56) References Cited

U.S. PATENT DOCUMENTS

| 10,378,415 B2 * | 8/2019 | Cole ..................... B01D 53/90 |
| 2010/0005871 A1 * | 1/2010 | Kitazawa ................ F01N 3/206 73/114.69 |
| 2011/0099983 A1 * | 5/2011 | Ohno .................... F01N 3/2066 60/277 |

(Continued)

OTHER PUBLICATIONS

Funk, S., et al. "Reductant Delivery Performance Monitoring Challenges in North America and Europe—GM Perspective", Published by General Motors at the SAE, 2017, 22 pages.

*Primary Examiner* — Binh Q Tran
(74) *Attorney, Agent, or Firm* — Oblon, McClelland, Maier & Neustadt, L.L.P.

(57) ABSTRACT

In the abnormality diagnosis device which carries out an abnormality diagnosis of the reducing agent adding device by obtaining a diagnostic parameter which is a parameter correlated with an amount of pressure drop in a reducing agent passage in the case where, from a state in which an addition valve has been closed and in which a voltage to be applied to a pump is controlled to a diagnostic voltage so that the pressure in the reducing agent passage becomes a predetermined pressure, the addition valve is made to open in a state where the voltage to be applied to the pump is maintained at the diagnostic voltage, and by making a comparison between the diagnostic parameter and a predetermined threshold value, the abnormality diagnosis is carried out by using the diagnostic parameter or the predetermined threshold value which is corrected based on the pump discharge capacity of the pump.

9 Claims, 23 Drawing Sheets

(56) References Cited

U.S. PATENT DOCUMENTS

| | | | |
|---|---|---|---|
| 2011/0239628 A1* | 10/2011 | Tanioka | F01N 3/208 60/276 |
| 2012/0255282 A1* | 10/2012 | Nagata | F01N 3/208 60/274 |
| 2015/0104363 A1 | 4/2015 | Singh et al. | |
| 2015/0153244 A1* | 6/2015 | Nienhoff | F01N 3/208 73/40 |

* cited by examiner

[Fig. 1]
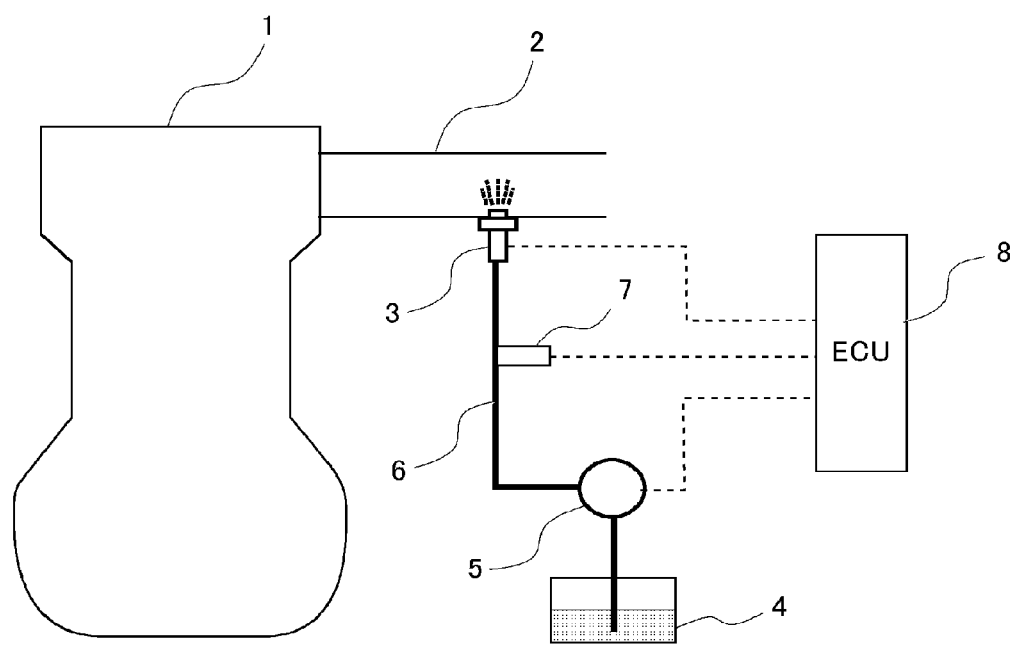

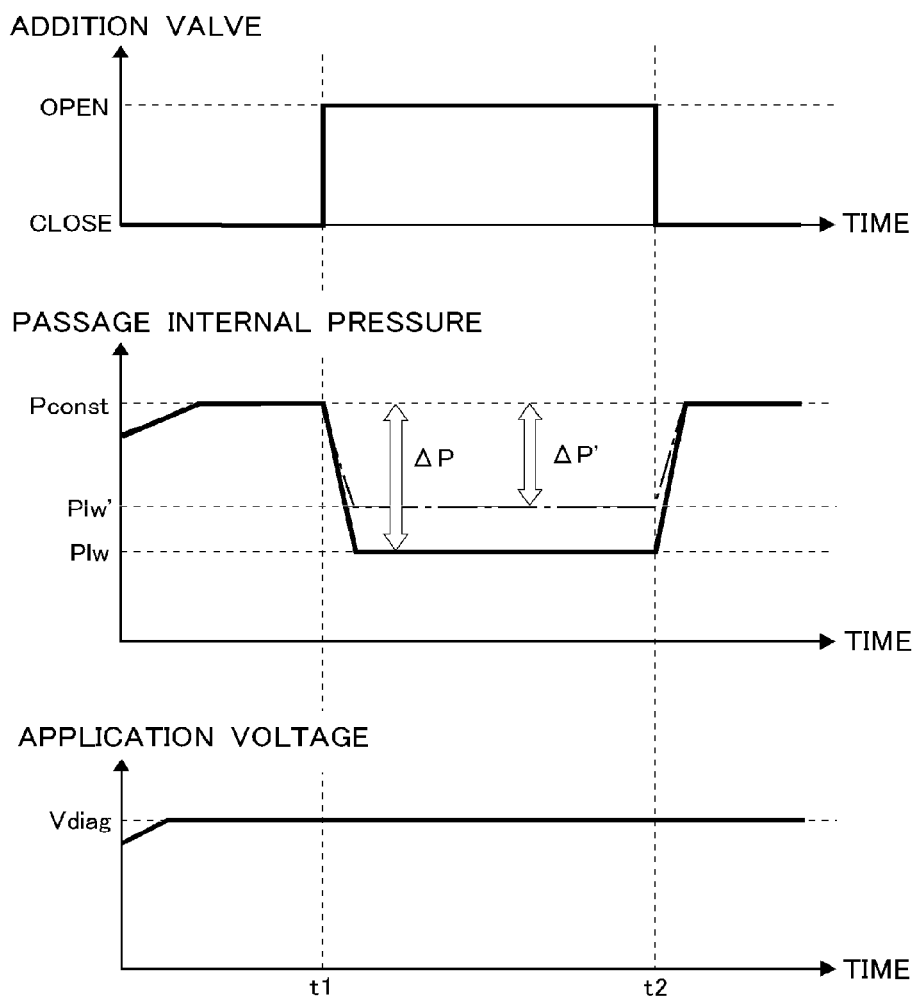

[Fig. 3]
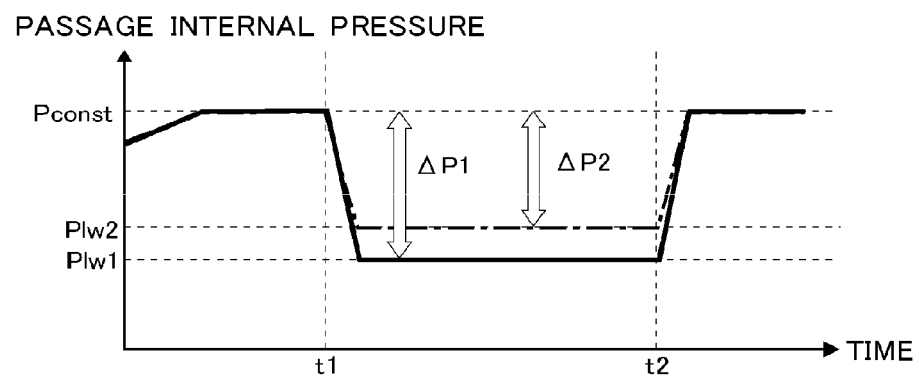

[Fig. 4]
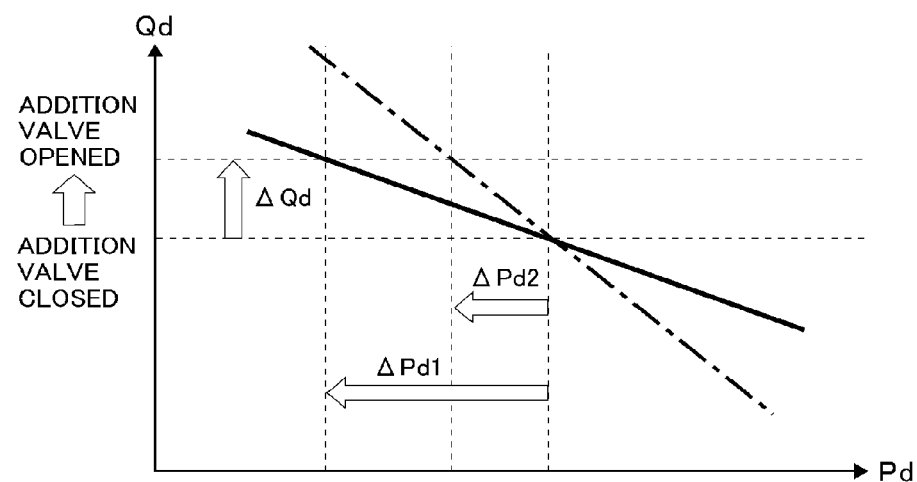

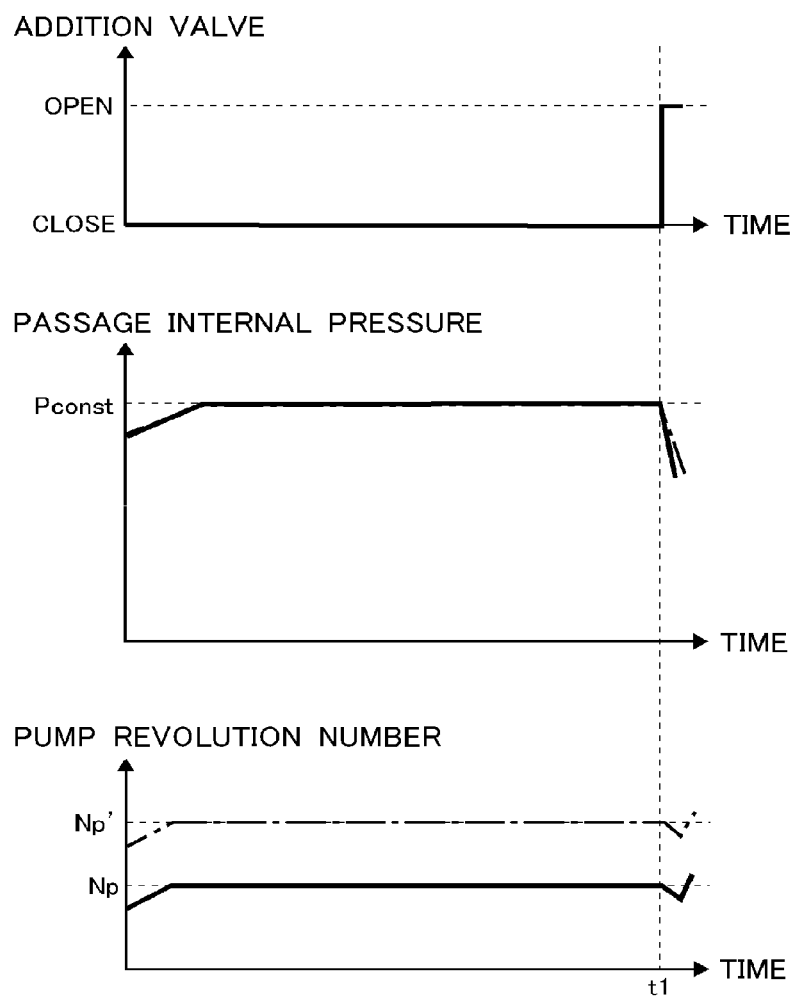
[Fig. 5]

[Fig. 6]
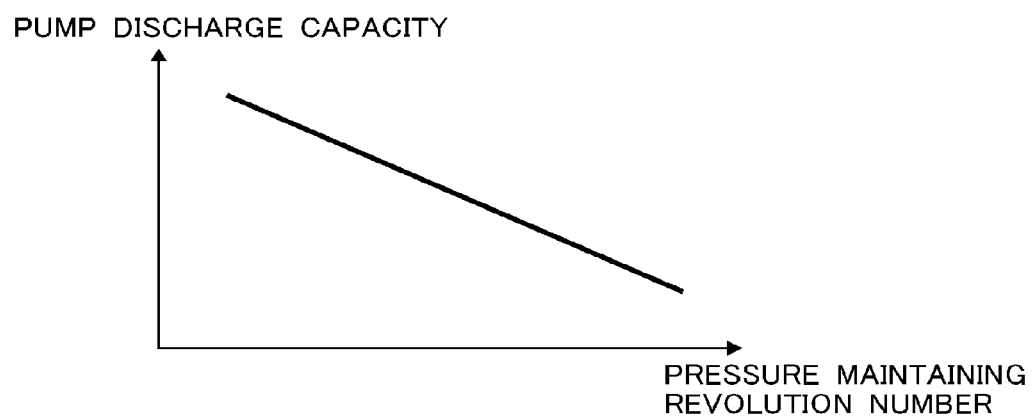

[Fig. 7]
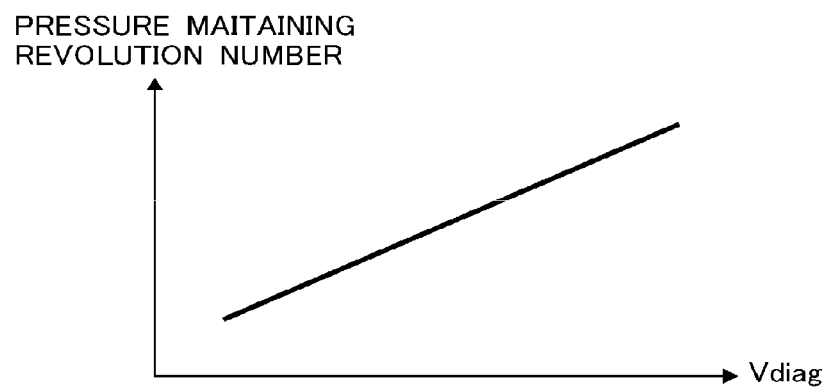

[Fig. 8]
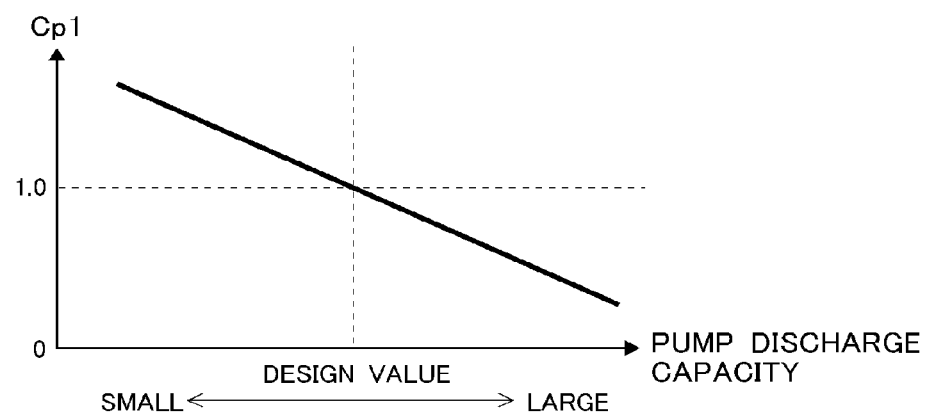

[Fig. 9]
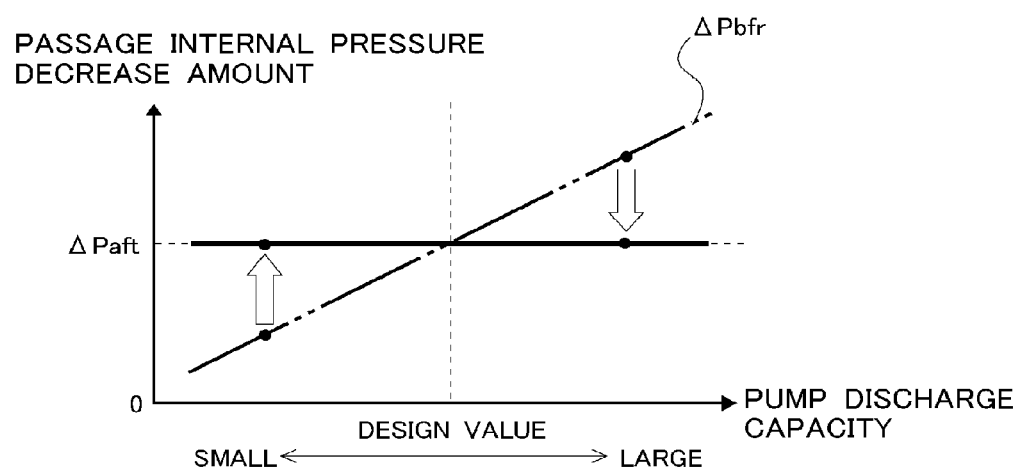

[Fig. 10]
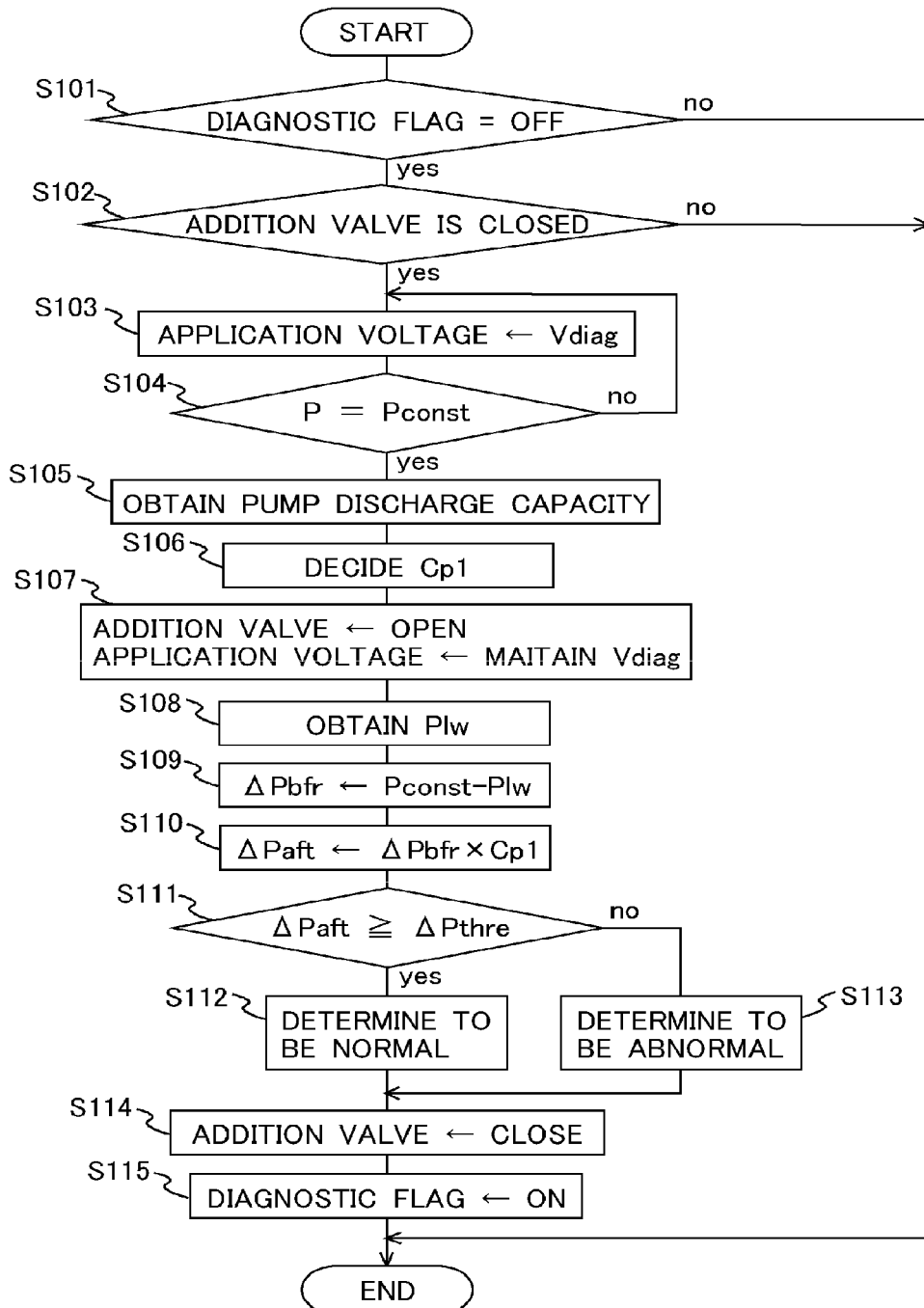

[Fig. 11]
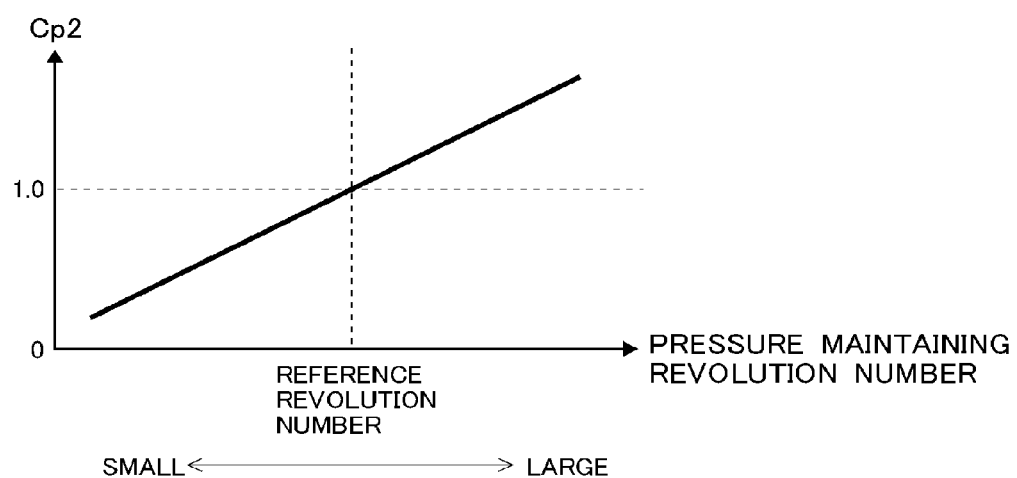

[Fig. 12]
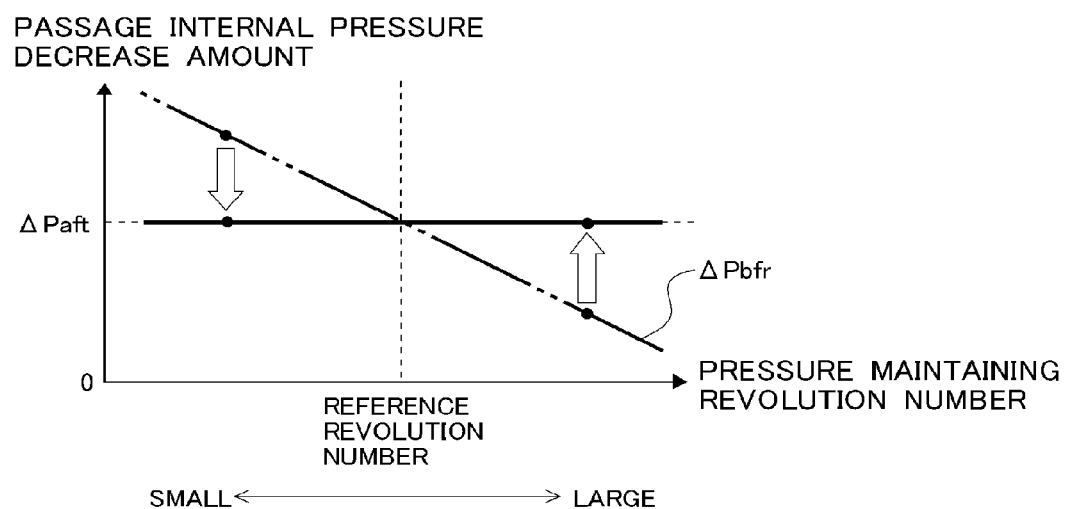

[Fig. 13]
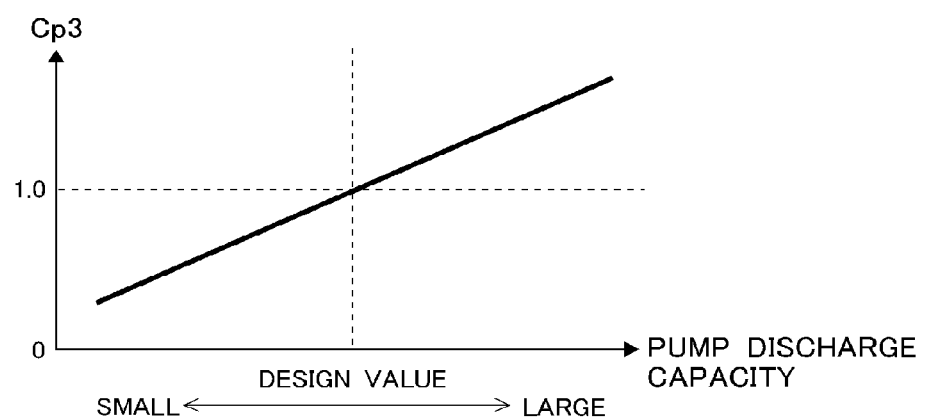

[Fig. 14]
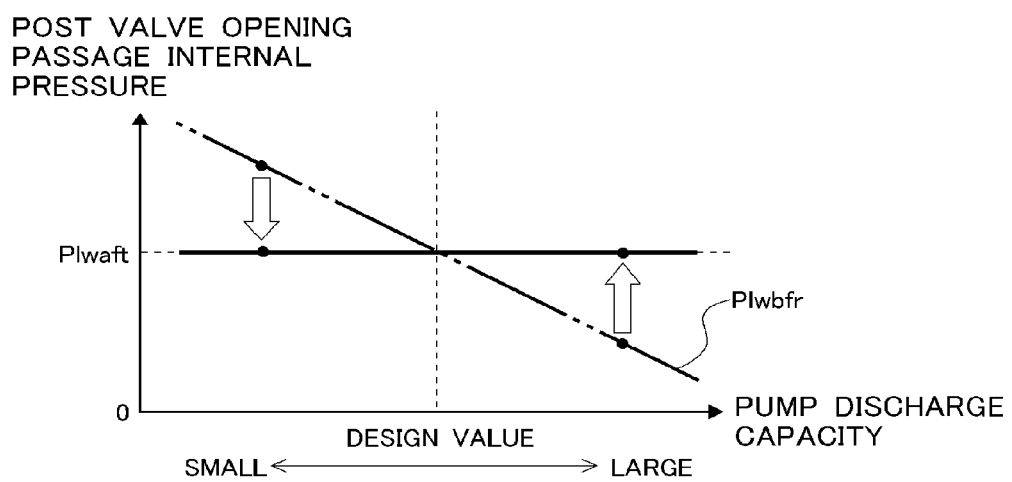

[Fig. 15]
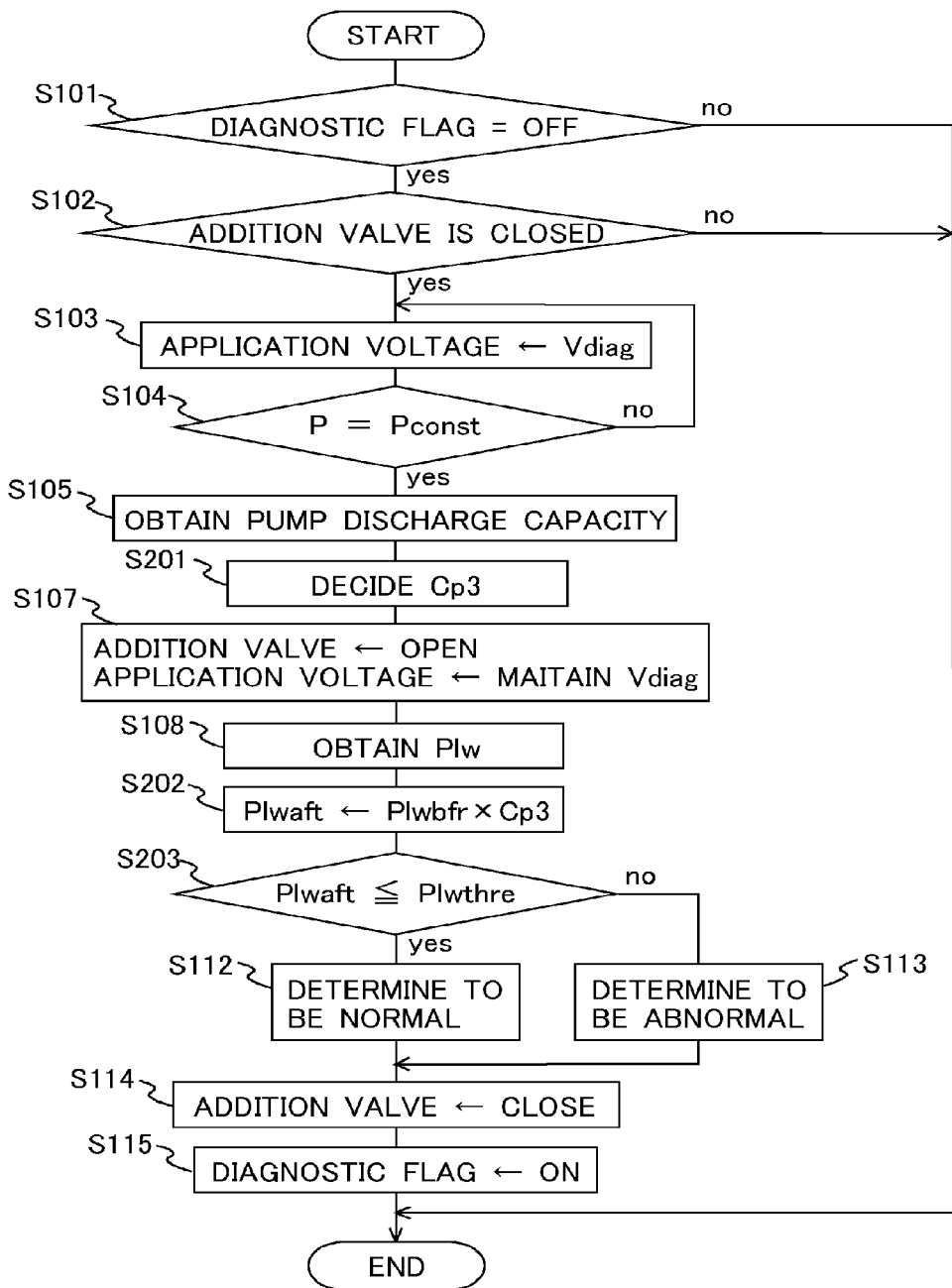

[Fig. 16]
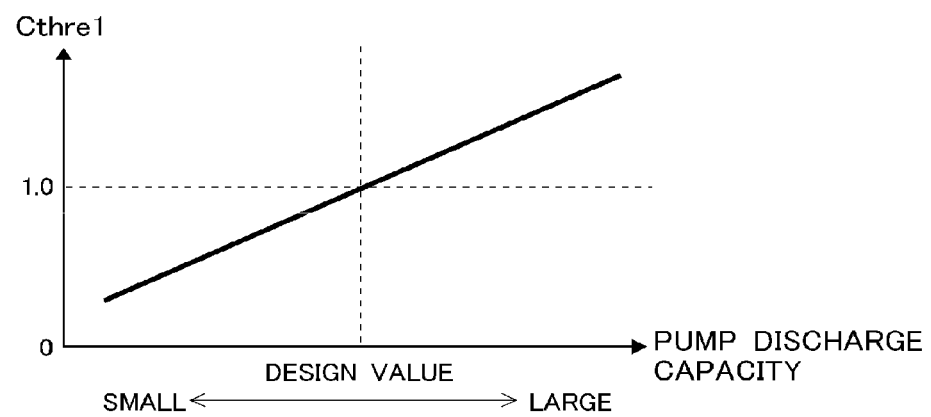

[Fig. 17]
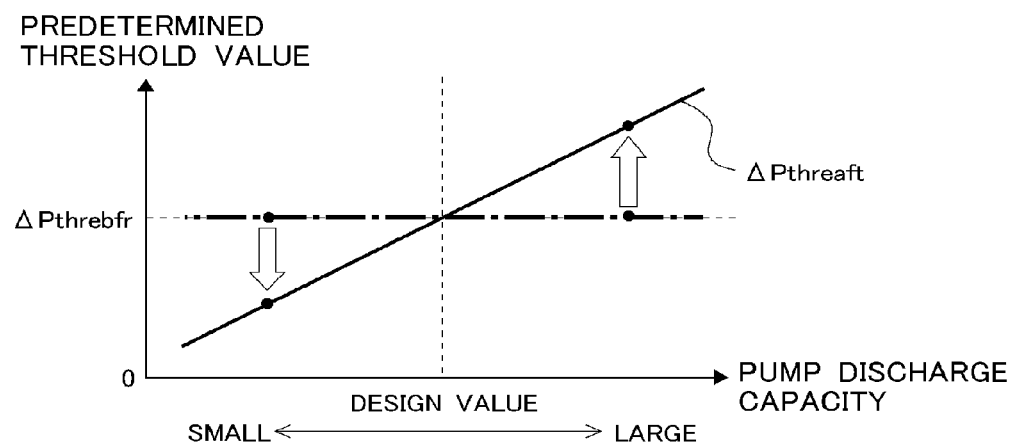

[Fig. 18]
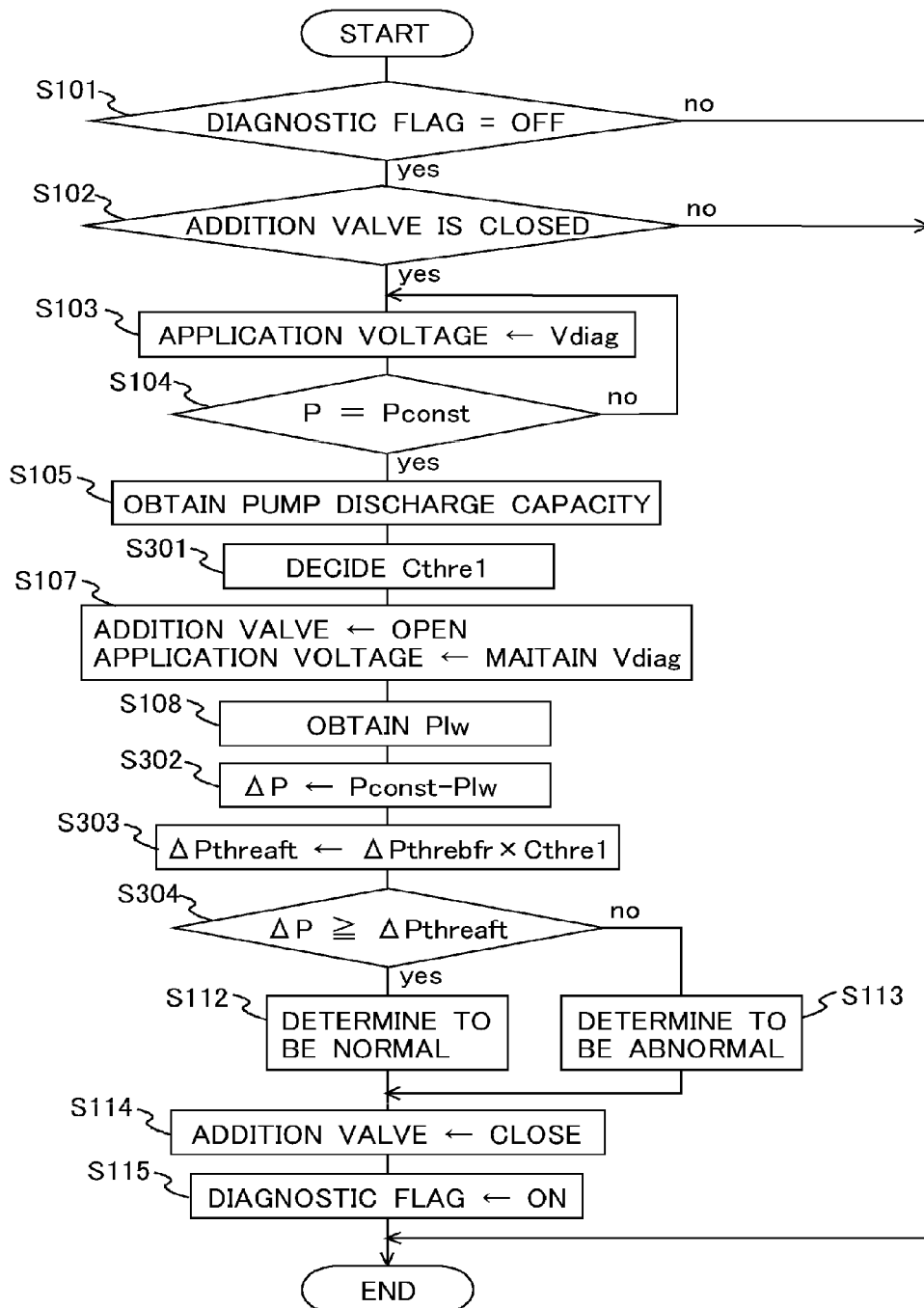

[Fig. 19]
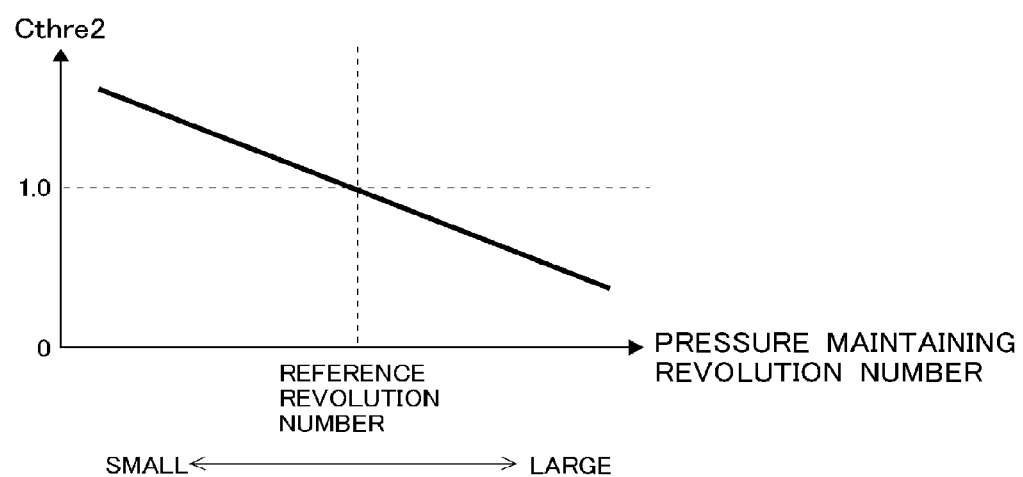

[Fig. 20]
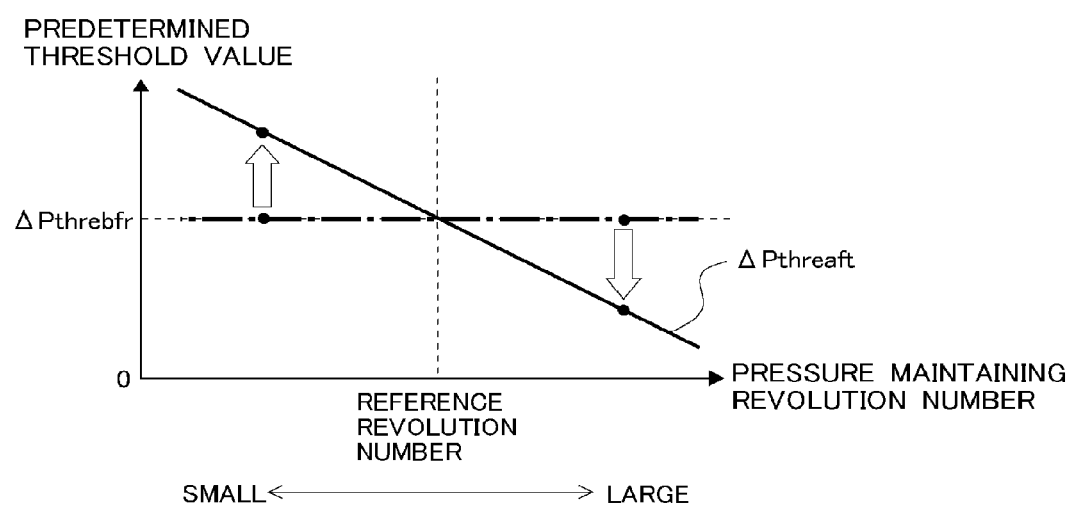

[Fig. 21]
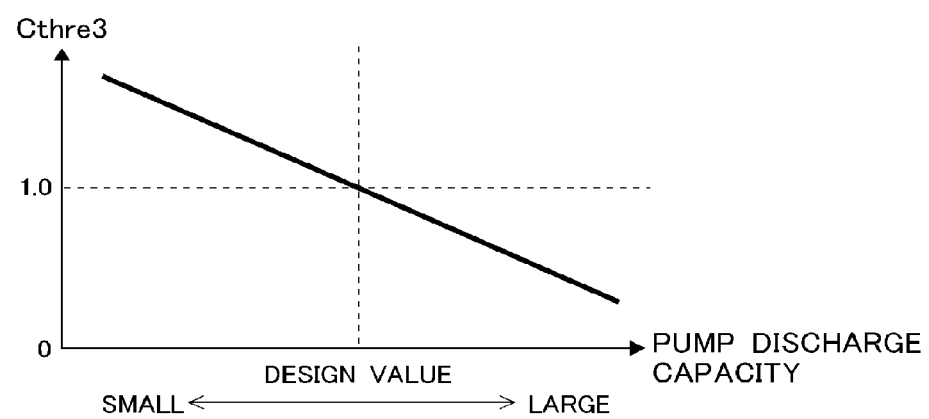

[Fig. 22]
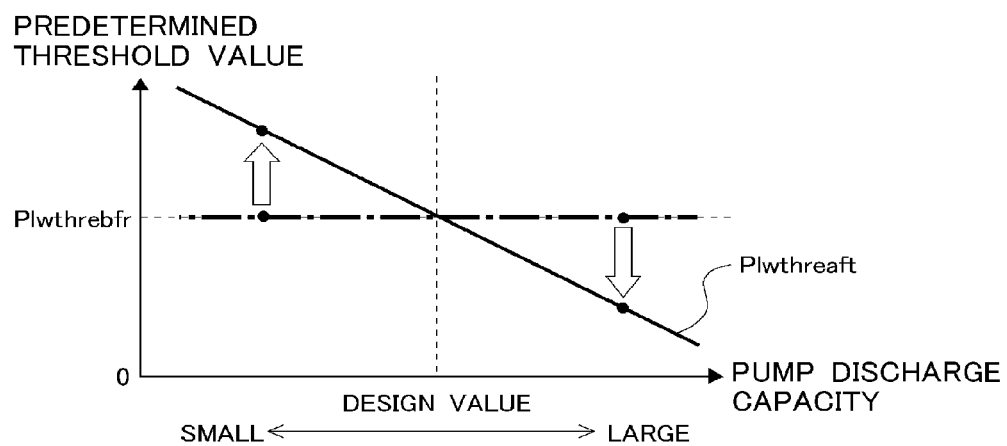

[Fig. 23]
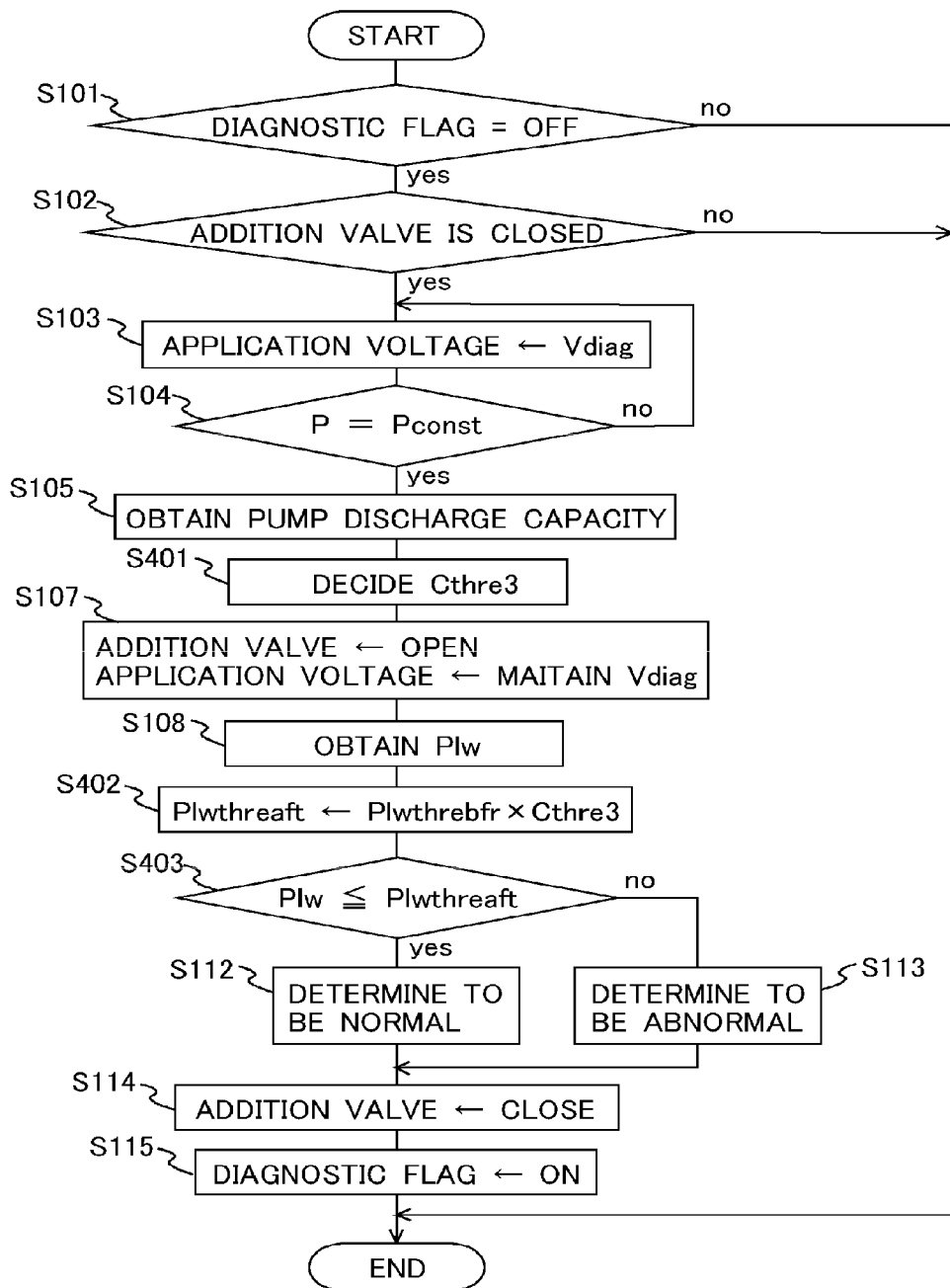

ABNORMALITY DIAGNOSIS DEVICE FOR REDUCING AGENT ADDING DEVICE

CROSS REFERENCE TO RELATED APPLICATIONS

This application claims the benefit of Japanese Patent Application No. 2017-239728, filed on Dec. 14, 2017, which is hereby incorporated by reference herein in its entirety.

BACKGROUND

Technical Field

The present disclosure relates to an abnormality diagnosis device for a reducing agent adding device for adding a reducing agent into an exhaust gas of an internal combustion engine.

Description of the Related Art

As a reducing agent adding device for adding a reducing agent into an exhaust gas of an internal combustion engine, there has been known one which is provided with an addition valve arranged in an exhaust passage of the internal combustion engine, an electric pump for pressure feeding the reducing agent to the addition valve, and a pressure sensor arranged in a reducing agent passage connecting the pump and the addition valve with each other. In such a reducing agent adding device, the amount of the reducing agent to be added into the exhaust gas from the reducing agent adding device may become smaller than a desired target amount, resulting from the degradation over time of the addition valve, the reduction in channel cross section due to deposition or accumulation of substances precipitated from the reducing agent on the reducing agent passage, etc. As a result of this, it may become unable to purify or remove harmful gas components using the reducing agent in an appropriate manner.

Regarding the problems as mentioned above, in the past, first, a voltage to be applied to the pump is adjusted so that the pressure in the reducing agent passage becomes a predetermined pressure in a state where the addition valve has been closed. Subsequently, the addition valve is made to open in a state where the voltage to be applied to the pump is maintained at a voltage adjusted as mentioned above. Then, there has been proposed a method of carrying out abnormality diagnosis of the reducing agent adding device based on a pressure decrease amount (an amount of pressure decrease from the above-mentioned predetermined pressure) in the reducing agent passage after the opening of the addition valve (for example, see patent literature 1). In this method, when the above-mentioned pressure decrease amount is smaller than a predetermined threshold value, it is estimated that the amount of the reducing agent to be added from the addition valve is smaller than a proper amount, whereby a determination is made that the reducing agent adding device is abnormal.

CITATION LIST

Patent Literature

Patent Literature 1: US Patent Application Publication No. 2015/104363

SUMMARY

However, an amount of discharge of the reducing agent per revolution of the pump (hereinafter, sometimes referred to as a "pump discharge capacity") may vary with variation in pump efficiency resulting from initial tolerance, aging, etc., of the pump. Here, in the method described in the patent literature 1, the pressure decrease amount in the reducing agent passage at the time when the addition valve is switched from a valve closed state to a valve open state tends to become larger in the case where the pump discharge capacity of the pump is large than in the case where it is small. For that reason, in cases where the pump discharge capacity of the pump used for the reducing agent adding device is small, the degradation over time of the addition valve and the reduction in the channel cross section of the reducing agent passage are relatively slight, but the pressure decrease amount becomes less than the predetermined threshold value, as a result of which the reducing agent adding device may be incorrectly determined to be abnormal. On the other hand, in cases where the pump discharge capacity of the pump used for the reducing agent adding device is large, the degradation over time of the addition valve and the reduction in the channel cross section of the reducing agent passage are relatively very great, but the pressure decrease amount becomes equal to or more than the predetermined threshold value, as a result of which the reducing agent adding device may be incorrectly determined to be normal.

The present disclosure has been made in view of the actual circumstances as referred to above, and the object of the present disclosure is to provide a technique which can suppress a decrease in diagnostic accuracy under the influence of a pump discharge capacity in an abnormality diagnosis device for a reducing agent adding device.

According to the present disclosure, in order to solve the above-mentioned problems, in an abnormality diagnosis device which carries out an abnormality diagnosis of a reducing agent adding device by obtaining a parameter correlated with an amount of pressure drop in a reducing agent passage (i.e., a diagnostic parameter) in the case where, from a state in which an addition valve has been closed and in which a voltage to be applied to a pump is adjusted so that the pressure in the reducing agent passage becomes a predetermined pressure, the addition valve is made to open in a state where the voltage to be applied to the pump is maintained at an application voltage thus adjusted, and by making a comparison between the diagnostic parameter and a predetermined threshold value, the diagnostic parameter or the predetermined threshold value is corrected based on a pump discharge capacity of the pump, and the abnormality diagnosis of the reducing agent adding device is carried out by using the diagnostic parameter or the predetermined threshold value thus corrected. Here, note that the abnormality of the reducing agent adding device referred to herein indicates a state where the amount of the reducing agent added into the exhaust gas from the reducing agent adding device becomes excessively smaller than a desired target amount to such an extent that it becomes difficult to reduce and purify harmful gas components in the exhaust gas in an effective manner, resulting from the degradation over time of the addition valve, the reduction in channel cross section due to deposition or accumulation of substances precipitated from the reducing agent on the reducing agent passage, and so on.

Specifically, the present disclosure is directed to an abnormality diagnosis device applied to a reducing agent adding device which includes: an addition valve configured to add a reducing agent to an exhaust gas flowing through an exhaust passage of an internal combustion engine; an electric pump configured to pump up the reducing agent stored in a reducing agent tank; a reducing agent passage configured to introduce the reducing agent discharged from the pump to the addition valve; and a pressure sensor configured to detect a pressure in the reducing agent passage. This abnormality diagnosis device comprises: a pump control unit configured to control a voltage to be applied to the pump to a diagnostic voltage which is a voltage at which the pressure detected by the pressure sensor becomes a predetermined pressure in a state where the addition valve is closed; an addition valve control unit configured to switch the addition valve from a valve closed state to a valve open state in a state where the voltage to be applied to the pump is maintained at the diagnostic voltage by the pump control unit; a diagnostic parameter obtaining unit configured to obtain a diagnostic parameter, which is a parameter correlated with an amount of decrease in pressure in the reducing agent passage, based on the pressure detected by the pressure sensor after the addition valve is switched from the valve closed state to the valve open state by the addition valve control unit; and an abnormality diagnosis unit configured to carry out an abnormality diagnosis of the reducing agent adding device by making a comparison between the diagnostic parameter obtained by the diagnostic parameter obtaining unit and a predetermined threshold value. Here, the abnormality diagnosis device according to the present disclosure further comprises: a pump discharge capacity obtaining unit configured to obtain a pump discharge capacity which is an amount of discharge per revolution of the pump; and a correction unit configured to correct either one of the diagnostic parameter obtained by the diagnostic parameter obtaining unit and the predetermined threshold value, based on the pump discharge capacity obtained by the pump discharge capacity obtaining unit. Then, the abnormality diagnosis unit carries out the abnormality diagnosis of the reducing agent adding device by using the diagnostic parameter or the predetermined threshold value corrected by the correction unit.

In the abnormality diagnosis device constructed in this manner, first, when the addition valve is in the valve closed state, the voltage to be applied to the pump is controlled by the pump control unit so that the pressure detected by the pressure sensor (the pressure in the reducing agent passage) becomes the predetermined pressure, thereby adjusting the voltage to be applied to the pump to the diagnostic voltage. Here, note that the "diagnostic voltage" referred to herein is not a fixed value, but may change with the pump discharge capacity, as will be described later. Subsequently, the addition valve is changed from the valve closed state to the valve open state by the addition valve control unit in the state where the voltage to be applied to the pump is maintained at the diagnostic voltage by the pump control unit. In that case, in a construction in which the degree of opening of the addition valve can be changed in a stepwise manner or in a stepless manner, it is assumed that the degree of opening of the addition valve is set to a certain degree of opening which has been determined in advance (e.g., a full opening degree). As a result, the reducing agent in the reducing agent passage is added from the addition valve to the exhaust gas in the exhaust passage, whereby the pressure in the reducing agent passage is decreased. At that time, the diagnostic parameter obtaining unit obtains, based on the pressure detected by the pressure sensor after opening of the addition valve, the diagnostic parameter which is a parameter correlated with an amount of decrease in the pressure in the reducing agent passage (i.e., a pressure decrease amount from the predetermined pressure, and hereinafter sometimes referred to as a "passage internal pressure decrease amount").

Here, when the cross-sectional area of the reducing agent passage is reduced due to the degradation over time of the addition valve, or the accumulation of the substances precipitated from the reducing agent on the reducing agent passage, the amount of the reducing agent to be added into the exhaust gas from the reducing agent adding device (the amount of addition of the reducing agent) becomes smaller than the desired target amount, and the passage internal pressure decrease amount also accordingly becomes small. Accordingly, a method is considered in which when the passage internal pressure decrease amount is smaller than an allowable range (e.g., a range of the passage internal pressure decrease amount in which it is assumed that the reduction and purification of harmful gas components using the reducing agent can be carried out in an effective manner), a determination is made that the reducing agent adding device is abnormal. That is, a method is considered in which the abnormality diagnosis of the reducing agent adding device is carried out by making a comparison between the diagnostic parameter obtained by the diagnostic parameter obtaining unit and the predetermined threshold value.

However, the passage internal pressure decrease amount may change not only depending on whether the reducing agent adding device is normal or abnormal, but also depending on the pump discharge capacity of the pump. The "pump discharge capacity" referred to herein is an amount of discharge per revolution of the pump, as mentioned above, and is correlated with the efficiency of the pump. Then, the pump discharge capacity of the pump may vary with initial tolerance at the time of production of the pump, variation in the pump efficiency resulting from the change over time of the pump in the process of use thereof, etc. For example, the passage internal pressure decrease amount tends to become larger in the case where the pump discharge capacity of the pump is large, in comparison with the case where it is small. For that reason, in cases where an actual pump discharge capacity is larger than a pump discharge capacity assumed at the time of designing the pump, the passage internal pressure decrease amount tends to become larger than an assumed one. On the other hand, in cases where the actual pump discharge capacity is smaller than the pump discharge capacity assumed at the time of designing the pump, the passage internal pressure decrease amount tends to become smaller than the assumed one. When an abnormality diagnosis according to the above-mentioned method is carried out without taking into consideration the variation in the passage internal pressure decrease amount resulting from such a variation in the pump discharge capacity, a decrease in diagnostic accuracy may be caused. For example, in cases where the actual pump discharge capacity of the pump is larger than the pump discharge capacity assumed at the time of designing the pump, the passage internal pressure decrease amount tends to become large, as a result of which the reducing agent adding device may be incorrectly determined to be normal, even though it is abnormal. On the other hand, in cases where the actual pump discharge capacity of the pump is smaller than the pump discharge capacity assumed at the time of designing the pump, the passage internal pressure decrease amount tends to become small, as a result of which the reducing agent adding device may be incorrectly determined to be abnormal, even though it is normal.

On the other hand, in the abnormality diagnosis device according to the present disclosure, the pump discharge capacity of the pump is obtained by the pump discharge capacity obtaining unit, as a preparatory step for carrying out the abnormality diagnosis according to the above-mentioned method. Moreover, the correction unit corrects either one of the diagnostic parameter obtained by the diagnostic parameter obtaining unit and the predetermined threshold value based on the pump discharge capacity obtained by the pump discharge capacity obtaining unit. Then, after the preparatory step as mentioned above, the abnormality diagnosis unit carries out the abnormality diagnosis of the reducing agent adding device by using the diagnostic parameter or the predetermined threshold value corrected by the correction unit. According to such a construction, the variation in the diagnostic parameter resulting from the variation in the pump discharge capacity is rectified by correction of the diagnostic parameter, or by correction of the predetermined threshold value. As a result, it is possible to suppress the reduction in accuracy of the abnormality diagnosis resulting from the variation in the pump discharge capacity.

The pump discharge capacity obtaining unit according to the present disclosure may derive a revolution number parameter which is a parameter correlated with a pressure maintaining revolution number which is the number of revolutions per unit time of the pump at the time when the addition valve is in the valve closed state, and when the voltage to be applied to the pump is controlled at the diagnostic voltage by the pump control unit, and may obtain the pump discharge capacity based on the revolution number parameter and a correlation in which the pressure maintaining revolution number becomes smaller as the pump discharge capacity becomes larger. Here, there is a tendency that the pressure maintaining revolution number becomes smaller in the case where the pump discharge capacity of the pump is large, in comparison with the case where it is small. Accordingly, the pump discharge capacity of the pump can be obtained by deriving the revolution number parameter correlated with the pressure maintaining revolution number, when the addition valve is in the valve closed state and when the voltage to be applied to the pump is in the state of being controlled to the diagnostic voltage by the pump control unit. Here, note that as the "revolution number parameter" referred to herein, the number of revolutions per unit time of the pump itself can also be used, or the voltage to be applied to the pump (the diagnostic voltage), which is in a proportional relation with the number of revolutions per unit time of the pump, can be used, too.

Here, note that as the diagnostic parameter according to the present disclosure, there may be used the passage internal pressure decrease amount which is a difference between the pressure detected by the pressure sensor after the addition valve has been switched from the valve closed state to the valve open state by the addition valve control unit (i.e., when the decrease in the passage internal pressure accompanying the opening of the addition valve has stopped), and the predetermined pressure. In that case, when the passage internal pressure decrease amount obtained by the diagnostic parameter obtaining unit is smaller than the predetermined threshold value, the abnormality diagnosis unit may determine that the reducing agent adding device is abnormal, but on the other hand, when the passage internal pressure decrease amount obtained by the diagnostic parameter obtaining unit is equal to or larger than the predetermined threshold value, the abnormality diagnosis unit may determine that the reducing agent adding device is normal. The predetermined threshold value in this case is a value with which when the passage internal pressure decrease amount becomes smaller than the predetermined threshold value, it is assumed that the amount of the reducing agent to be added into the exhaust gas from the addition valve (the amount of addition of the reducing agent) becomes excessively smaller than the desired target amount, and hence becomes small to such an extent that it becomes difficult to reduce and purify (remove) the harmful gas components in the exhaust gas in an effective manner. Then, the correction unit may correct the pressure decrease amount obtained by the diagnostic parameter obtaining unit so as to be smaller, or may correct the predetermined threshold value so as to be larger, in the case where the pump discharge capacity obtained by the pump discharge capacity obtaining unit is large, in comparison with the case where it is small.

Here, in the case where the predetermined pressure is set to a fixed value which has been decided in advance, an absolute amount of the pressure detected by the pressure sensor (hereinafter, sometimes referred to as a "post valve opening passage internal pressure") after the addition valve is switched from the valve closed state to the valve open state, while the voltage to be applied to the pump is maintained at the diagnostic voltage, is correlated with the passage internal pressure decrease amount. That is, in cases where the predetermined pressure is set to the fixed value, the post valve opening passage internal pressure becomes smaller as the passage internal pressure decrease amount becomes larger. Accordingly, in cases where the predetermined pressure is set to the fixed value decided in advance, the post valve opening passage internal pressure may be used as the diagnostic parameter according to the present disclosure. In that case, when the post valve opening passage internal pressure obtained by the diagnostic parameter obtaining unit is larger than a predetermined threshold value, the abnormality diagnosis unit may determine that the reducing agent adding device is abnormal, but on the other hand, when the post valve opening passage internal pressure obtained by the diagnostic parameter obtaining unit is equal to or smaller than the predetermined threshold value, the abnormality diagnosis unit may determine that the reducing agent adding device is normal. Then, the correction unit may correct the post valve opening pressure decrease amount obtained by the diagnostic parameter obtaining unit so as to be larger, or may correct the predetermined threshold value so as to be smaller, in the case where the pump discharge capacity obtained by the pump discharge capacity obtaining unit is large, in comparison with the case where it is small.

According to the present disclosure, it becomes possible to suppress a decrease in diagnostic accuracy under the influence of a pump discharge capacity, in an abnormality diagnosis device for a reducing agent adding device.

BRIEF DESCRIPTION OF DRAWINGS

FIG. 1 is a view showing the schematic construction of a reducing agent adding device in a first embodiment of the present disclosure.

FIG. 2 is a timing chart for explaining an execution method for abnormality diagnosis processing.

FIG. 3 is a timing chart showing the changes over time of passage internal pressure in the case of carrying out the abnormality diagnosis processing by using pumps having pump discharge capacities different from each other.

FIG. 4 is a view showing a correlation between a discharge pressure and a discharge flow rate of each pump at the time of execution of the abnormality diagnosis processing.

FIG. 5 is a timing chart showing the changes over time of the passage internal pressure and the number of revolutions per unit time (pressure maintaining revolution number) of each pump at the time when an addition valve is in a valve closed state, and when the passage internal pressure is in a state of being maintained at a predetermined pressure.

FIG. 6 is a view showing a relation between the pressure maintaining revolution number and a pump discharge capacity.

FIG. 7 is a view showing a correlation between a diagnostic voltage and the pressure maintaining revolution number.

FIG. 8 is a view for deciding a correction coefficient Cp1 based on the pump discharge capacity in the first embodiment.

FIG. 9 is a view showing a relation between a passage internal pressure decrease amount before correction and a passage internal pressure decrease amount after correction in the first embodiment.

FIG. 10 is a flow chart showing a processing routine which is executed by an ECU at the time when the abnormality diagnosis processing is carried out in the first embodiment.

FIG. 11 is a view for deciding a correction coefficient Cp2 based on the pressure maintaining revolution number in a first modification of the first embodiment.

FIG. 12 is a view showing a relation between a passage internal pressure decrease amount before correction and a passage internal pressure decrease amount after correction in the first modification of the first embodiment.

FIG. 13 is a view for deciding a correction coefficient Cp3 based on the pump discharge capacity in a second modification of the first embodiment.

FIG. 14 is a view showing a relation between a post valve opening passage internal pressure before correction and a post valve opening passage internal pressure after correction in the second modification of the first embodiment.

FIG. 15 is a flow chart showing a processing routine which is executed by the ECU at the time when abnormality diagnosis processing is carried out in the second modification of the first embodiment.

FIG. 16 is a view for deciding a correction coefficient Cthre1 based on the pump discharge capacity in a second embodiment of the present disclosure.

FIG. 17 is a view showing a relation between a predetermined threshold value before correction and a predetermined threshold value after correction in the second embodiment.

FIG. 18 is a view showing a processing routine which is executed by the ECU at the time when abnormality diagnosis processing is carried out in the second embodiment.

FIG. 19 is a view for deciding a correction coefficient Cthre2 based on the pressure maintaining revolution number in a first modification of the second embodiment.

FIG. 20 is a view showing a relation between a predetermined threshold value before correction and a predetermined threshold value after correction in the first modification of the second embodiment.

FIG. 21 is a view for deciding a correction coefficient Cthre3 based on the pump discharge capacity in a second modification of the second embodiment.

FIG. 22 is a view showing a relation between a predetermined threshold value before correction and a predetermined threshold value after correction in the second modification of the second embodiment.

FIG. 23 is a flow chart showing a processing routine which is executed by the ECU at the time when abnormality diagnosis processing is carried out in the second modification of the second embodiment.

DESCRIPTION OF EMBODIMENTS

Hereinafter, specific modes or embodiments of the present disclosure will be described based on the attached drawings. However, the dimensions, materials, shapes, relative arrangements and so on of component parts described in the embodiments are not intended to limit the technical scope of the present disclosure to these alone in particular as long as there are no specific statements.

First Embodiment

First, reference will be made to a first embodiment of the present disclosure based on FIGS. 1 through 10. FIG. 1 is a view showing the schematic construction of a reducing agent adding device, to which an abnormality diagnosis device according to the present disclosure is applied. The reducing agent adding device shown in FIG. 1 is provided with an addition valve 3 arranged in an exhaust passage 2 of an internal combustion engine 1, a tank 4 configured to store a reducing agent, a pump 5 configured to pump up the reducing agent stored in the tank 4, a reducing agent passage 6 configured to introduce the reducing agent discharged from the pump 5 to the addition valve 3, and a pressure sensor 7 arranged in the middle of the reducing agent passage 6. Here, note that though not clearly shown in FIG. 1, a return passage configured to return a surplus of the reducing agent to an inlet opening of the pump 5 or the tank 4 from the reducing agent passage 6 may be formed in the reducing agent adding device.

The addition valve 3 is a valve mechanism configured to add the reducing agent into the exhaust gas flowing through the exhaust passage 2, and the opening and closing operation of the addition valve 3 is electrically controlled by an ECU 8 which will be described later. The reducing agent stored in the tank 4 is, for example, ammonia ($NH_3$), an additive agent which is a precursor of ammonia, or fuel. The pressure sensor 7 is a sensor configured to detect the pressure in the reducing agent passage 6.

The reducing agent adding device constructed as mentioned above has the ECU (Electronic Control Unit) 8 configured to control an amount of addition, addition timing, etc., of the reducing agent to be added by the reducing agent adding device. This ECU 8 may be exclusively used for controlling the reducing agent adding device, but here serves for dual purposes, and also functions as an ECU for controlling the operating state of the internal combustion engine 1. The ECU 8 is a unit composed of a CPU, a ROM, a RAM, a backup RAM, and so on. This ECU 8 is electrically connected to various kinds of sensors (e.g., an accelerator position sensor, a crank position sensor, a cooling water temperature sensor, etc.) necessary for grasping the operating state of the internal combustion engine 1, in addition to the above-mentioned pressure sensor 7, so that output signals of these various kinds of sensors are able to be inputted to the ECU 8. Moreover, the ECU 8 is also electrically connected to various kinds of equipment (e.g., fuel injection valves, a throttle valve, etc.) of the internal combustion engine 1, in addition to the above-mentioned addition valve 3 and pump 5, so that it is able to electrically control these various kinds of equipment.

Here, the ECU 8 carries out addition control of the reducing agent based on the operating state of the internal combustion engine 1. For example, the ECU 8 first decides the amount and addition timing of the reducing agent to be added from the addition valve 3 based on the operating state of the internal combustion engine 1. Subsequently, the ECU 8 causes the reducing agent to be added into the exhaust gas in the exhaust passage 2 from the addition valve 3 by controlling the pump 5 and the addition valve 3 according to the amount of addition and the addition timing thus decided.

The reducing agent added into the exhaust gas from the addition valve 3 in this manner flows into an unillustrated exhaust gas purification catalyst (e.g., a selective catalytic reduction catalyst (SCR (Selective Catalytic Reduction) catalyst) or an NOx storage reduction catalyst (NSR (NOx Storage Reduction) catalyst)) together with the exhaust gas, and acts as a reducing agent for the NOx contained in the exhaust gas or the NOx stored in the NSR catalyst, thereby reducing the NOx to nitrogen ($N_2$).

However, due to the reduction in the channel cross section of the reducing agent passage 6 by the deposition or accumulation of the substances precipitated from the above-mentioned reducing agent (e.g., urea precipitated from an aqueous urea solution), etc., on the reducing agent passage 6, or due to the degradation over time of the addition valve 3, the amount of the reducing agent actually added from the addition valve 3 may become smaller than a desired target amount of addition. In that case, there is a fear that it will become difficult to reduce and remove the harmful gas components such as NOx contained in the exhaust gas in an effective manner by making use of the reducing agent. Thus, in cases where there has occurred an abnormality such as a case where the amount of the reducing agent actually added from the addition valve 3 becomes smaller than the desired target amount of addition, it is necessary to detect the occurrence of such an abnormality with sufficient accuracy, and to demand the replacement or repair of the reducing agent adding device from the user of a vehicle on which the device is mounted. Accordingly, the ECU 8 in this embodiment also carries out abnormality diagnosis processing of the reducing agent adding device, in addition to the addition control of the reducing agent as referred to above. In the following, reference will be made to a method of carrying out the abnormality diagnosis processing in this embodiment.

<Abnormality Diagnosis Processing>

Here, an example of the method of carrying out the abnormality diagnosis processing is shown in FIG. 2. FIG. 2 is a timing chart showing the changes over time of a switching (opening and closing) condition of the addition valve 3, a pressure in the reducing agent passage 6 (passage internal pressure) and a voltage to be applied to the pump 5, in the case where the abnormality diagnosis processing is carried out. In a view showing the change over time of the passage internal pressure in FIG. 2, a solid line indicates the change over time of the passage internal pressure in the case where the reducing agent adding device is normal, and an alternate long and short dash line indicates the change over time of the passage internal pressure in the case where the reducing agent adding device is abnormal. Here, note that the pump discharge capacity of the pump 5 is the same between the case where the reducing agent adding device is normal and the case where the reducing agent adding device is abnormal.

The abnormality diagnosis processing shown in FIG. 2 is carried out when the addition valve 3 is in a valve closed state. That is, when the addition valve 3 is in the valve closed state, the ECU 8 first controls the voltage to be applied to the pump 5 so that the pressure in the reducing agent passage 6 detected by the pressure sensor 7 (passage internal pressure) becomes a predetermined pressure which has been decided in advance. As a result, when the passage internal pressure becomes stable at the predetermined pressure, the ECU 8 switches the addition valve 3 from the valve closed state to a valve open state, while maintaining the voltage to be applied to the pump 5 (diagnostic voltage) Vdiag at that time (t1 in FIG. 2). When the addition valve 3 is switched from the valve closed state to the valve open state in a state where the voltage to be applied to the pump 5 is maintained at the diagnostic voltage Vdiag, the passage internal pressure will change from the above-mentioned predetermined pressure to a decreasing direction, accompanying the reducing agent in the reducing agent passage 6 being added into the exhaust gas from the addition valve 3. Here, the amount of the reducing agent to be added into the exhaust gas from the addition valve 3 per unit time becomes smaller in the case where the reducing agent adding device is abnormal, in comparison with the case where it is normal. Accordingly, in the case where the addition valve 3 is switched from the valve closed state to the valve open state while the voltage to be applied to the pump 5 is maintained at the diagnostic voltage Vdiag, the passage internal pressure after the opening of the addition valve 3 (i.e., post valve opening passage internal pressure) become larger in the case where the reducing agent adding device is abnormal (Plw' in FIG. 2) than in the case where the reducing agent adding device is normal (ΔPlw in FIG. 2). That is, an amount of decrease in the passage internal pressure (passage internal pressure decrease amount) in the case where the addition valve 3 is switched from the valve closed state to the valve open state while the voltage to be applied to the pump 5 is maintained at the diagnostic voltage Vdiag becomes smaller in the case where the reducing agent adding device is abnormal (ΔP' (=Pconst−Plw') in FIG. 2) than in the case where the reducing agent adding device is normal (ΔP (=Pconst−Plw) in FIG. 2).

Accordingly, it is considered that the abnormality diagnosis of the reducing agent adding device is carried out by a method in which in the case where the addition valve 3 is switched from the valve closed state to the valve open state while the voltage to be applied to the pump 5 is maintained at the diagnostic voltage Vdiag, the passage internal pressure decrease amount is obtained by detecting the passage internal pressure after the opening of the addition valve 3 (the post valve opening passage internal pressure), and by subtracting from the above-mentioned predetermined pressure the post valve opening passage internal pressure thus detected, wherein when the passage internal pressure decrease amount is equal to or more than a predetermined threshold value, a determination is made that the reducing agent adding device is normal, but on the other hand, when the passage internal pressure decrease amount is less than the predetermined threshold value, a determination is made that the reducing agent adding device is abnormal. Here, note that the "predetermined threshold value" referred to herein is a value with which when the passage internal pressure decrease amount becomes less than the predetermined threshold value, it is estimated that the amount of the reducing agent to be actually added from the addition valve 3 becomes excessively smaller with respect to the desired target amount of addition, and hence it becomes difficult to reduce and purify (remove) the harmful gas components in the exhaust gas in an effective manner. The predetermined threshold value is decided by assuming a case where the pump discharge capacity is the same as a design value, as will be described later.

However, the amount of discharge of the reducing agent per revolution of the pump 5 (the pump discharge capacity) is a physical quantity correlated with a pump efficiency. This pump discharge capacity may vary with initial tolerance at the time of production of the pump 5, variation in the pump efficiency resulting from the change over time of the pump 5 in the process of use thereof, etc. In other words, the pump discharge capacity of the pump 5 may have deviated from the pump discharge capacity (design value) assumed at the time of designing the pump 5, and at the same time an amount of deviation thereof may be different for each individual pump. When the abnormality diagnosis processing according to the above-mentioned method is carried out without taking into consideration such a variation in the pump discharge capacity, a decrease in diagnostic accuracy may be caused, and besides, an incorrect diagnosis may also be caused. Here, in FIG. 3, there are shown the changes over time of the passage internal pressure in the case of carrying out the abnormality diagnosis processing by using pumps having pump discharge capacities different from each other. A solid line in FIG. 3 indicates a case where a pump having a relatively large pump discharge capacity is used, and an alternate long and short dash line in FIG. 3 indicates a case where a pump having a relatively small pump discharge capacity is used. Here, note that conditions other than the pump discharge capacities are the same between the solid line and the alternate long and short dash line in FIG. 3. As shown in FIG. 3, an amount of decrease in the passage internal pressure (passage internal pressure decrease amount) in the case where the addition valve 3 is switched from the valve closed state to the valve open state while the voltage to be applied to the pump 5 is maintained at the diagnostic voltage Vdiag becomes smaller in the case where the pump discharge capacity is small ($\Delta P2$ in FIG. 3) than in the case where the pump discharge passage is large ($\Delta P1$ in FIG. 3). This is considered because, as shown in FIG. 4, when the addition valve 3 is switched from the valve closed state to the valve open state while the voltage to be applied to the pump 5 is maintained at the diagnostic voltage Vdiag, the amount of the reducing agent discharged from the pump 5 per unit time (discharge flow rate) Qd increases by a fixed amount $\Delta Qd$ due to a reduction in the load acting on the pump 5, but an amount of decrease in the discharge pressure Pd of the pump 5 in that case becomes smaller in the case where the pump discharge capacity is small ($\Delta Pd2$ in FIG. 4) than in the case where the pump discharge capacity is large ($\Delta Pd1$ in FIG. 4). Here, note that a solid line in FIG. 4 indicates a case where a pump having a relatively large pump discharge capacity is used, and an alternate long and short dash line in FIG. 4 indicates a case where a pump having a relatively small pump discharge capacity is used. According to a correlation as shown in FIG. 4, it is considered that the amount of decrease in the discharge pressure Pd of the pump 5 at the time when the addition valve 3 is switched from the valve closed state to the valve open state while the voltage to be applied to the pump 5 is maintained at the diagnostic voltage Vdiag becomes smaller in the case where the pump discharge capacity is small, in comparison with the case where it is large, as a result of which the discharge pressure Pd of the pump 5 after the opening of the addition valve 3 becomes large, and the post valve opening passage internal pressure also accordingly becomes large, so the passage internal pressure decrease amount becomes small.

Here, note that the relation between the discharge pressure Pd and the discharge flow rate Qd as shown in FIG. 4 can be represented by the following expression (1).

$$Qd = (1/(\alpha \times \beta \times Kt)) \times (Eb - ((Ra \times Tm)/Kt)) - ((\gamma \times Ra)/(\alpha \times \beta \times Kt^2)) \times Pd \qquad (1)$$

In expression (1) above, Ra indicates an internal resistance of an electric motor for driving the pump 5; Kt indicates a torque constant of the electric motor; Eb indicates a drive voltage (a voltage to be applied) to the electric motor; and Tm indicates a mechanical loss of the pump 5. In addition, in expression (1) above, a coefficient $\alpha$ is a constant which corresponds to the pump discharge capacity; ß is a constant of proportionality between a constant correlated with a back electromotive force of the electric motor generated by the rotation of the pump 5 (i.e., a back electromotive force constant), and a torque constant of the electric motor; and $\gamma$ is a constant of proportionality between an execution torque of the electric motor and the discharge flow rate Qd.

According to expression (1) above, the value of the coefficient $\alpha$ becomes larger in the case where the pump discharge capacity of the pump 5 is large, in comparison with the case where it is small, so the slope of a linear function of the discharge pressure Pd and the discharge flow rate Qd as shown in FIG. 4 becomes smaller. As a result, an amount of decrease in the discharge pressure Pd of the pump 5 at the time when the addition valve 3 is switched from the valve closed state to the valve open state while the voltage to be applied to the pump 5 is maintained at the diagnostic voltage Vdiag becomes smaller in the case where the pump discharge capacity is small than in the case where the pump discharge passage is large. Accordingly, the discharge pressure Pd of the pump 5 after the opening of the addition valve 3 becomes larger in the case where the pump discharge capacity is small than in the case where the pump discharge capacity is large. As a result of this, it is considered that the post valve opening passage internal pressure becomes higher, and the passage internal pressure decrease amount accordingly becomes smaller, in the case where the pump discharge capacity of the pump 5 is small, in comparison with the case where it is large.

Accordingly, when the abnormality diagnosis of the reducing agent adding device is carried out without taking into consideration the variation in the passage internal pressure decrease amount resulting from the variation in the pump discharge capacity as mentioned above, diagnostic accuracy may be reduced, and besides, an incorrect diagnosis may be caused. For example, in cases where the pump discharge capacity of the pump 5 is larger than the design value thereof, even if the reducing agent adding device is abnormal, the above-mentioned passage internal pressure decrease amount may become equal to or more than the predetermined threshold value, as a result of which there is a fear that the reducing agent adding device may be incorrectly diagnosed to be normal. On the other hand, in cases where the pump discharge capacity of the pump 5 is smaller than the design value thereof, even if the reducing agent adding device is normal, the above-mentioned passage internal pressure decrease amount may become less than the predetermined threshold value, as a result of which there is a fear that the reducing agent adding device may be incorrectly diagnosed to be abnormal.

For the above-mentioned problem, in the abnormality diagnosis processing in this embodiment, the pump discharge capacity of the pump 5 is obtained as a preparatory step, and the above-mentioned passage internal pressure decrease amount is corrected based on the pump discharge capacity thus obtained. Then, a determination as to whether the reducing agent adding device is normal or abnormal is made by making a comparison between the passage internal pressure decrease amount thus corrected and the predetermined threshold value.

<Method of Obtaining the Pump Discharge Capacity>

First, reference will be made to a method of obtaining the pump discharge capacity based on FIGS. 5 through 7. FIG. 5 is a timing chart showing the changes over time of the passage internal pressure and the number of revolutions per unit time of each pump 5 at the time when the addition valve 3 is in the valve closed state, and when the passage internal pressure is in the state of being maintained at the predetermined pressure. A solid line in FIG. 5 indicates a case where the pump discharge capacity of the pump 5 is relatively large, and an alternate long and short dash line in FIG. 5 indicates a case where the pump discharge capacity of the pump 5 is relatively small.

As shown in FIG. 5, the number of revolutions per unit time of the pump 5 in the case where the addition valve 3 is in the valve closed state, and where the passage internal pressure is in the state of being maintained at the predetermined pressure Pconst becomes larger in the case where the pump discharge capacity of the pump 5 is small (Np' in FIG. 5) than in the case where the pump discharge capacity of the pump 5 is large (Np in FIG. 5). This is because the amount of the reducing agent discharged per revolution of the pump 5 becomes smaller in the case where the pump discharge capacity of the pump 5 is small, in comparison with the case where it is large, and hence it is necessary to make larger the number of revolutions per unit time in order to maintain the passage internal pressure at the predetermined pressure Pconst. According to the correlation as shown in FIG. 5, it can be that the addition valve 3 is in the valve closed state at the time of the execution of the abnormality diagnosis processing, and the number of revolutions per unit time (hereinafter, sometimes referred to as a "pressure maintaining revolution number") of the pump 5 when the passage internal pressure is in the state of being maintained at the predetermined pressure Pconst is correlated with the pump discharge capacity of the pump 5. Specifically, the above-mentioned pressure maintaining revolution number and the pump discharge capacity of the pump 5 has a relation that the pump discharge capacity becomes smaller in proportion to the pressure maintaining revolution number, as shown in FIG. 6. Accordingly, the relation between the pressure maintaining revolution number and the pump discharge capacity as shown in FIG. 6 has been obtained in advance from the results of experiments or simulations, and at the same time, the relation therebetween thus obtained has been stored in the ROM of the ECU 8, etc., in the form of a map, a function expression, or the like. With this, the ECU 8 detects the pressure maintaining revolution number at the time of the execution of the abnormality determination processing, thereby making it possible to derive the pump discharge capacity by using as an argument the pressure maintaining revolution number thus detected.

Here, as a method of detecting the number of revolutions per unit time of the pump 5, there can be used a method in which a sensor for detecting the rotational position of a rotation shaft of the pump 5 is mounted on the pump 5, and the number of revolutions per unit time of the pump 5 is calculated from the rotational position detected by the sensor. Here, note that the number of revolutions per unit time of the pump 5 tends to become larger in proportion to the voltage to be applied to the pump 5 (see FIG. 7). For that reason, the pressure maintaining revolution number can be obtained from the voltage to be applied to the pump 5 (the diagnostic voltage Vdiag) at the time when the addition valve 3 is in the valve closed state and when the passage internal pressure is in the state of being maintained at the predetermined pressure Pconst, and then, the pump discharge capacity can also be derived from the pressure maintaining revolution number thus obtained. In that case, it is not necessary to mount the sensor for detecting the number of revolutions per unit time of the pump 5 on the pump 5, so an increase in the number of component parts can be suppressed. In addition, the above-mentioned diagnostic voltage Vdiag has a relation with the pump discharge capacity, and becomes smaller in proportion to the pump discharge capacity, similar to the pressure maintaining revolution number, so a map, a function expression or the like for deriving the pump discharge capacity of the pump 5 by using the diagnostic voltage Vdiag as an argument may have been created in advance based on the result of experiments or simulations.

<Method of Correcting the Passage Internal Pressure Decrease Amount>

Next, reference will be made to a method of correcting the passage internal pressure decrease amount based on the pump discharge capacity of the pump 5 in this embodiment. In this embodiment, the ECU 8 corrects the passage internal pressure decrease amount based on the following expression (2).

$$\Delta Paft = \Delta Pbfr \times Cp1 \quad (2)$$

In expression (2) above, $\Delta Paft$ indicates a passage internal pressure decrease amount after correction; $\Delta Pbfr$ indicates a passage internal pressure decrease amount before correction; and $Cp1$ indicates a correction coefficient based on the pump discharge capacity. As shown in FIG. 8, the correction coefficient $Cp1$ referred to herein is set as a positive number, in such a manner that when the pump discharge capacity matches the design value, the correction coefficient $Cp1$ becomes "1.0", and when the pump discharge capacity is larger than the design value, the larger the pump discharge capacity, the smaller the correction coefficient $Cp1$ becomes than "1.0", and on the other hand, when the pump discharge capacity is smaller than the design value, the smaller the pump discharge capacity, the larger the correction coefficient $Cp1$ becomes than "1.0". Such a relation between the pump discharge capacity and the correction coefficient $Cp1$ has been set in advance by adaptation work based on the result of experiments or simulations. Here, although in an example shown in FIG. 8, the correction coefficient $Cp1$ and the pump discharge capacity are in linear relation with each other, this is because the relation between the pump discharge capacity and the passage internal pressure decrease amount before correction becomes linear, as shown in FIG. 9 to be described later. Thus, in cases where the relation between the pump discharge capacity and the passage internal pressure decrease amount before correction becomes nonlinear, the correction coefficient $Cp1$ should only be set so that the relation between the correction coefficient $Cp1$ and the pump discharge capacity accordingly becomes nonlinear, too.

When the passage internal pressure decrease amount is corrected according to the correction coefficient $Cp1$ and the expression (2) as mentioned above, as shown in FIG. 9, in cases where the pump discharge capacity is larger than the design value, the passage internal pressure decrease amount $\Delta Pbfr$ before correction becomes larger than the passage internal pressure decrease amount which is assumed in the case where the pump discharge capacity becomes the design value, but in contrast to this, the passage internal pressure decrease amount $\Delta Paft$ after correction is decreased to a value equivalent to the passage internal pressure decrease amount which is assumed in the case where the pump discharge capacity becomes the design value. On the other hand, in cases where the pump discharge capacity is smaller than the design value, the passage internal pressure decrease amount $\Delta Pbfr$ before correction becomes smaller than the passage internal pressure decrease amount which is assumed in the case where the pump discharge capacity becomes the design value, but in contrast to this, the passage internal pressure decrease amount ΔPaft after correction is increased to a value equivalent to the passage internal pressure decrease amount which is assumed in the case where the pump discharge capacity becomes the design value. Then, when the abnormality diagnosis processing is carried out by making a comparison between the passage internal pressure decrease amount ΔPaft corrected in such a manner and the predetermined threshold value, even in cases where the pump discharge capacity has deviated from the design value, a decrease in diagnostic accuracy can be suppressed, thus making it possible to suppress the occurrence of incorrect diagnosis.

<Abnormality Diagnosis Processing Flow>

In the following, an execution procedure of the abnormality diagnosis processing in this embodiment will be described along with FIG. 10. FIG. 10 is a flow chart which shows a processing routine carried out by the ECU 8 at the time when the abnormality diagnosis processing according to this embodiment is performed. This processing routine has been stored in the ROM, etc., of the ECU 8 in advance, and is carried out at a predetermined cycle by means of the CPU of the ECU 8.

In the processing routine shown in FIG. 10, first in the processing of step S101, the ECU 8 determines whether a diagnostic flag is off. The diagnostic flag referred to herein is a flag which is set to off at the time of starting of the internal combustion engine 1, and is set to on at the time of the completion of the abnormality diagnosis processing. Accordingly, when the diagnostic flag is on, the abnormality diagnosis processing has already been carried out during the current operating period of the internal combustion engine 1, whereas when the diagnostic flag is off, the abnormality diagnosis processing has not yet been carried out during the current operating period of the internal combustion engine 1. Accordingly, in cases where a negative determination is made in the processing of step S101 (diagnostic flag=on), the ECU 8 ends the execution of this processing routine. On the other hand, in cases where an affirmative determination is made in the processing of step S101 (diagnostic flag=off), the routine of the ECU 8 goes to the processing of step S102.

In the processing of step S102, the ECU 8 determines whether the addition valve 3 is in the valve closed state. In cases where a negative determination is made in the processing of step S102 (i.e., in cases where the addition valve 3 is in the valve open state), the ECU 8 ends the execution of this processing routine, without carrying out the abnormality diagnosis processing. On the other hand, in cases where an affirmative determination is made in the processing of step S102 (i.e., in cases where the addition valve 3 is in the valve closed state), the ECU 8 carries out the abnormality diagnosis processing in the processing of step S103 onward.

In the processing of step S103, the ECU 8 adjusts the voltage to be applied to the pump 5 to the diagnostic voltage Vdiag. The diagnostic voltage Vdiag is a voltage to be applied to the pump 5 at the time when the passage internal pressure P detected by the pressure sensor 7 becomes the predetermined pressure Pconst, as mentioned above, and is a value which changes according to the actual pump discharge capacity of the pump 5.

In the processing of step S104, the ECU 8 determines whether the passage internal pressure P detected by the pressure sensor 7 has converged to the predetermined pressure Pconst. In that case, when the passage internal pressure P has not converged to the predetermined pressure Pconst, a negative determination will be made in the processing of step S104, so the routine of the ECU 8 returns to the processing of step S103. On the other hand, when the passage internal pressure P has converged to the predetermined pressure Pconst, an affirmative determination will be made in the processing of step S104, so the routine of the ECU 8 goes to the processing of step S105.

Here, note that the ECU 8 carries out the above-mentioned processings of steps S103 and S104, thereby achieving a "pump control unit" according to the present disclosure.

In the processing of step S105, the ECU 8 obtains the pump discharge capacity of the pump 5. Specifically, the ECU 8 first derives the pressure maintaining revolution number by accessing the map or the function expression as shown in FIG. 7 using as an argument the voltage to be applied to the pump 5 (the diagnostic voltage Vdiag) at the time when the passage internal pressure P has converged to the predetermined pressure Pconst, as mentioned above. Subsequently, the ECU 8 derives the pump discharge capacity of the pump 5 by accessing the map or the function expression as shown in FIG. 7 using as an argument the above-mentioned pressure maintaining revolution number. Here, note that the correlation between the diagnostic voltage Vdiag and the pump discharge capacity may have been stored in advance in the ROM of the ECU 8 in the form of a map or a function expression, whereby the pump discharge capacity may be derived from the map or function expression thus stored by using the diagnostic voltage Vdiag as an argument. In addition, in the construction in which the sensor for detecting the number of revolutions per unit time of the pump 5 is mounted on the pump 5, the ECU 8 may derive the pressure maintaining revolution number based on a detection signal of the sensor at the time when the passage internal pressure P has converged to the predetermined pressure Pconst. The ECU 8 carries out the processing of step S105 according to such a method, thereby achieving a "pump discharge capacity obtaining unit" according to the present disclosure.

In the processing of step S106, the ECU 8 decides the above-mentioned correction coefficient Cp1. Specifically, the ECU 8 derives the correction coefficient Cp1 corresponding to the pump discharge capacity, by accessing the above-mentioned map or function expression as shown in FIG. 8 using as an argument the pump discharge capacity obtained in the above-mentioned processing of step S105.

In the processing of step S107, the ECU 8 switches the addition valve 3 from the valve closed state to the valve open state, while maintaining the voltage to be applied to the pump 5 at the diagnostic voltage Vdiag. Here, in a construction in which the degree of opening of the addition valve 3 can be changed in a stepwise manner or in a stepless manner, it is assumed that the degree of opening of the addition valve 3 is set to a certain degree of opening which has been determined in advance (e.g., a full opening degree). As a result, the reducing agent in the reducing agent passage 6 is added from the addition valve 3 into the exhaust gas, whereby the passage internal pressure P is decreased, as described in the above-mentioned explanation of FIG. 2. Here, note that the ECU 8 carries out the processing of step S107, thereby achieving an "addition valve control unit" according to the present disclosure.

In the processing of step S108, the ECU 8 obtains the post valve opening passage internal pressure Plw by monitoring the passage internal pressure P detected by the pressure sensor 7 after the opening of the addition valve 3. The post valve opening passage internal pressure Plw referred to herein corresponds to the passage internal pressure P detected by the pressure sensor 7 at the time when the phenomenon of decrease in the passage internal pressure accompanying the shift of the addition valve 3 from the valve closed state to the valve open state stops, as shown in the above-mentioned FIG. 2.

In the processing of step S109, the ECU 8 calculates the passage internal pressure decrease amount ΔPbfr before correction by subtracting from the predetermined pressure Pconst the post valve opening passage internal pressure Plw obtained in the above-mentioned processing of step S108 (ΔPbfr=Pconst−Plw).

Here, note that the ECU 8 carries out the above-mentioned processings of steps S108 and S109, thereby achieving a "diagnostic parameter obtaining unit" according to the present disclosure.

In the processing of step S110, the ECU 8 calculates the passage internal pressure decrease amount ΔPaft after correction (=ΔPbfr×Cp1) by assigning, to the above-mentioned expression (1), the correction coefficient Cp1 decided in the above-mentioned processing of step S106 and the passage internal pressure decrease amount ΔPbfr before correction calculated in the above-mentioned processing of step S109. The passage internal pressure decrease amount ΔPaft after correction calculated in such a manner is a value which the passage internal pressure decrease amount can take when assuming that the pump discharge capacity is the same as the design value, as described in the above-mentioned explanation of FIG. 9. In other words, the passage internal pressure decrease amount ΔPaft after correction calculated in the processing of step S110 is a value at which the variation in the passage internal pressure decrease amount resulting from the variation in the pump discharge capacity is rectified.

Here, note that the ECU 8 carries out the above-mentioned processings of steps S106 and S110, thereby achieving a "correction unit" according to the present disclosure.

In the processing of step S111, the ECU 8 determines whether the reducing agent adding device is normal or not, by comparing the passage internal pressure decrease amount ΔPaft after correction calculated in the above-mentioned processing of step S110 with the predetermined threshold value ΔPthre. Specifically, the ECU 8 determines whether the passage internal pressure decrease amount ΔPaft after correction is equal to or more than the predetermined threshold value ΔPthre. As described before, the predetermined threshold value ΔPthre referred to herein is a value with which when the passage internal pressure decrease amount ΔPaft after correction becomes less than the predetermined threshold value ΔPthre, it is estimated that the amount of the reducing agent to be actually added from the addition valve 3 becomes excessively smaller with respect to the desired target amount of addition, and hence it becomes difficult to reduce and purify (remove) the harmful gas components in the exhaust gas in an effective manner. The predetermined threshold value ΔPthre is also a value which is decided by assuming the case where the pump discharge capacity is the same as the design value. In cases where an affirmative determination is made in the processing of the step S111 (ΔPaft≥ΔPthre), the routine of the ECU 8 goes to the processing of step S112, where a determination is made that the reducing agent adding device is normal. On the other hand, in cases where a negative determination is made in the processing of the step S111 (ΔPaft<ΔPthre), the routine of the ECU 8 goes to the processing of step S113, where a determination is made that the reducing agent adding device is abnormal.

Here, note that the ECU 8 carries out the above-mentioned processings of steps S111 through S113, thereby achieving an "abnormality diagnosis unit" according to the present disclosure.

When the above-mentioned processing of step S112 or S113 has been carried out, the routine of the ECU 8 goes to the processing of step S114, and returns the addition valve 3 to the valve closed state from the valve open state. Subsequently, the routine of the ECU 8 goes to the processing of step S115, and switches the diagnostic flag from off to on.

As described above, when the abnormality diagnosis processing is carried out according to the processing routine of FIG. 10, the variation in the passage internal pressure decrease amount resulting from the variation in the pump discharge capacity is rectified, and the passage internal pressure decrease amount after correction is utilized as the diagnostic parameter, so the decrease in diagnostic accuracy due to the variation in the pump discharge capacity is suppressed, whereby the occurrence of incorrect diagnosis is also suppressed.

<First Modification of the First Embodiment>

In the above-mentioned first embodiment, reference has been made to an example of correcting the passage internal pressure decrease amount based on the pump discharge capacity of the pump 5, but the passage internal pressure decrease amount can also be corrected by using the pressure maintaining revolution number correlated with the pump discharge capacity, instead of the pump discharge capacity. In that case, the ECU 8 should only correct the passage internal pressure decrease amount based on the following expression (3).

$$\Delta Paft = \Delta Pbfr \times Cp2 \qquad (3)$$

Cp2 in expression (3) above indicates a correction coefficient based on the pressure maintaining revolution number. As shown in FIG. 11, the correction coefficient Cp2 referred to herein is set as a positive value in such a manner that when the pressure maintaining revolution number is equal to a reference number of revolutions per unit time (hereinafter, also referred to as a reference revolution number), Cp2 becomes "1.0", and when the pressure maintaining revolution number becomes larger than the reference revolution number, the larger the pressure maintaining revolution number, the larger Cp2 becomes than "1.0", but on the other hand, when the pressure maintaining revolution number is smaller than the reference revolution number, the smaller the pressure maintaining revolution number, the smaller Cp2 becomes than "1.0". Here, note that the "reference revolution number" referred to herein is a value which the pressure maintaining revolution number can take when assuming the case where the pump discharge capacity is the same as the design value, and has been decided in advance based on the result of experiments or simulations. In addition, the relation between the pump discharge capacity and the correction coefficient Cp2 as mentioned above has been set in advance by adaptation work based on the result of experiments or simulations.

Here, although in an example shown in FIG. 11, the correction coefficient Cp2 and the pressure maintaining revolution number are in linear relation with each other, this is because the relation between the pressure maintaining revolution number and the passage internal pressure decrease amount before correction becomes linear, as shown in FIG. 12 to be described later. Thus, in cases where the relation between the pressure maintaining revolution number and the passage internal pressure decrease amount before correction becomes nonlinear, the correction coefficient Cp2 should only be set so that the relation between the correction coefficient Cp2 and the pressure maintaining revolution number accordingly becomes nonlinear, too.

When the passage internal pressure decrease amount is corrected according to the correction coefficient Cp2 and the expression (3) as mentioned above, as shown in FIG. 12, in cases where the pressure maintaining revolution number is larger than the reference revolution number (i.e., in cases where the pump discharge capacity is smaller than the design value), the passage internal pressure decrease amount ΔPbfr before correction becomes smaller than the passage internal pressure decrease amount which is assumed in the case where the pressure maintaining revolution number becomes equivalent to the reference revolution number (i.e., in the case where the pump discharge capacity is the same as the design value), but the passage internal pressure decrease amount ΔPaft after correction is increased to a value equivalent to the passage internal pressure decrease amount which is assumed in the case where the pressure maintaining revolution number becomes equivalent to the reference revolution number. On the other hand, in cases where the pressure maintaining revolution number is smaller than the reference revolution number (i.e., in cases where the pump discharge capacity is larger than the design value), the passage internal pressure decrease amount ΔPbfr before correction becomes larger than the passage internal pressure decrease amount which is assumed in the case where the pressure maintaining revolution number becomes equivalent to the reference revolution number, but the passage internal pressure decrease amount ΔPaft after correction is decreased to a value equivalent to the passage internal pressure decrease amount which is assumed in the case where the pressure maintaining revolution number becomes equivalent to the reference revolution number. Then, when the abnormality diagnosis processing is carried out by making a comparison between the passage internal pressure decrease amount ΔPaft corrected in such a manner and the predetermined threshold value, even in cases where the pump discharge capacity has deviated from the design value, a decrease in diagnostic accuracy can be suppressed, thus making it possible to suppress the occurrence of incorrect diagnosis.

Here, note that the pressure maintaining revolution number correlates with the diagnostic voltage as mentioned above. For that reason, the passage internal pressure decrease amount can also be corrected by using the diagnostic voltage, instead of the pressure maintaining revolution number.

<Second Modification of the First Embodiment>

In the above-mentioned first embodiment, there has been described an example using the passage internal pressure decrease amount as the diagnostic parameter, but in cases where the target value (the predetermined pressure) of the passage internal pressure at the time of adjusting the voltage to be applied to the pump 5 to the diagnostic voltage Vdiag in the state where the addition valve 3 is closed is set to a fixed value which has been decided in advance, an absolute amount of the passage internal pressure after the opening of the addition valve 3 (post valve opening passage internal pressure), in the case where the addition valve 3 is switched from the valve closed state to the valve open state while the voltage to be applied to the pump 5 is maintained at the diagnostic voltage Vdiag, can also be used as the diagnostic parameter.

Here, the above-mentioned passage internal pressure decrease amount becomes larger in the case where the reducing agent adding device is normal than in the case where the reducing agent adding device is abnormal, as described in the above-mentioned first embodiment. Accordingly, in the above-mentioned construction in which the predetermined pressure is set to the fixed value, the above-mentioned passage internal pressure decrease amount becomes larger in the case where the reducing agent adding device is normal, in comparison with the case where it is abnormal, and accordingly, the post valve opening passage internal pressure becomes smaller. As a result of this, in the construction in which the predetermined pressure is set to the fixed value, in cases where the abnormality diagnosis processing is carried out by using the post valve opening passage internal pressure as the diagnostic parameter, when the post valve opening passage internal pressure is equal to or smaller than the predetermined threshold value, a determination should only be made that the reducing agent adding device is normal, but on the other hand, when the post valve opening passage internal pressure is larger than the predetermined threshold value, a determination should only be made that the reducing agent adding device is abnormal. The "predetermined threshold value" referred to herein is a value with which when the post valve opening passage internal pressure becomes larger than the predetermined threshold value, it is estimated that the amount of the reducing agent to be actually added from the addition valve 3 becomes excessively smaller with respect to the desired target amount of addition, and hence it becomes difficult to reduce and purify (remove) the harmful gas components in the exhaust gas in an effective manner. The predetermined threshold value has been decided in advance by assuming the case where the pump discharge capacity is the same as the design value.

However, in cases where the abnormality diagnosis of the reducing agent adding device is carried out by using the post valve opening passage internal pressure as the diagnostic parameter, too, variation in the passage internal pressure decrease amount resulting from the variation in the pump discharge capacity of the pump 5 will occur, and accordingly, variation will occur in the post valve opening passage internal pressure, too. For example, the passage internal pressure decrease amount becomes larger in the case where the pump discharge capacity of the pump 5 is large, in comparison with the case where it is small, so the post valve opening passage internal pressure accordingly becomes smaller. Thus, in cases where the abnormality diagnosis of the reducing agent adding device is carried out by using the post valve opening passage internal pressure as the diagnostic parameter, it is necessary to rectify the variation in the post valve opening passage internal pressure resulting from the pump discharge capacity of the pump 5.

<Method of Correcting the Post Valve Opening Passage Internal Pressure>

Here, reference will be made to a method of correcting the post valve opening passage internal pressure resulting from the pump discharge capacity of the pump 5. In this modification, the ECU 8 corrects the post valve opening passage internal pressure based on the following expression (4).

$$Plwaft = Plwbfr \times Cp3 \qquad (4)$$

In expression (4) above, Plwaft indicates a post valve opening passage internal pressure after correction; Plwbfr indicates a post valve opening passage internal pressure before correction; and Cp3 indicates a correction coefficient based on the pump discharge capacity. As shown in FIG. 13, the correction coefficient Cp3 referred to herein is set as a positive number, in such a manner that when the pump discharge capacity is equal to the design value, the correction coefficient Cp3 becomes "1.0", and when the pump discharge capacity is larger than the design value, the larger the pump discharge capacity, the larger the correction coefficient Cp3 becomes than "1.0", and on the other hand, when the pump discharge capacity is smaller than the design value, the smaller the pump discharge capacity, the smaller the correction coefficient Cp3 becomes than "1.0". Here, note that the above-mentioned relation between the pump discharge capacity and the correction coefficient Cp3 has been set in advance by adaptation work based on the result of experiments or simulations.

Here, note that although in an example shown in FIG. 13, the correction coefficient Cp3 and the pump discharge capacity are in linear relation with each other, this is because the relation between the pump discharge capacity and the post valve opening passage internal pressure before correction becomes linear, as shown in FIG. 14 to be described later. Thus, in cases where the relation between the pump discharge capacity and the post valve opening passage internal pressure before correction becomes nonlinear, the correction coefficient Cp3 should only be set so that the relation between the correction coefficient Cp3 and the pump discharge capacity accordingly becomes nonlinear, too.

When the post valve opening passage internal pressure is corrected according to the correction coefficient Cp3 and the expression (4) as mentioned above, as shown in FIG. 14, in cases where the pump discharge capacity is larger than the design value, the post valve opening passage internal pressure Plwbfr before correction becomes smaller than the post valve opening passage internal pressure which is assumed in the case where the pump discharge capacity is the same as the design value, but in contrast to this, the post valve opening passage internal pressure Plwaft after correction is increased to a value equivalent to the post valve opening passage internal pressure which is assumed in the case where the pump discharge capacity is the same as the design value. On the other hand, in cases where the pump discharge capacity is smaller than the design value, the post valve opening passage internal pressure Plwbfr before correction becomes larger than the post valve opening passage internal pressure which is assumed in the case where the pump discharge capacity is the same as the design value, but in contrast to this, the post valve opening passage internal pressure Plwaft after correction is decreased to a value equivalent to the post valve opening passage internal pressure which is assumed in the case where the pump discharge capacity is the same as the design value. Then, when the abnormality diagnosis processing is carried out by making a comparison between the post valve opening passage internal pressure Plwaft after correction and the predetermined threshold value, even in cases where the pump discharge capacity has deviated from the design value, a decrease in diagnostic accuracy can be suppressed, thus making it possible to suppress the occurrence of incorrect diagnosis. Here, note that the correction of the post valve opening passage internal pressure may be carried out based on the pressure maintaining revolution number, instead of the pump discharge capacity. In that case, in cases where the pressure maintaining revolution number is larger than the reference revolution number (i.e., in cases where the pump discharge capacity is smaller than the design value), the post valve opening passage internal pressure should only be corrected to decrease, but in contrast to this, in cases where the pressure maintaining revolution number is smaller than the reference revolution number (i.e., in cases where the pump discharge capacity is larger than the design value), the post valve opening passage internal pressure should only be corrected to increase.

<Abnormality Diagnosis Processing Flow>

In the following, an execution procedure of the abnormality diagnosis processing in this modification will be described along with FIG. 15. FIG. 15 is a flow chart which shows a processing routine carried out by the ECU 8 at the time when the abnormality diagnosis processing according to this modification is performed. Here, note that in FIG. 15, the same reference signs are attached to the same processings as in the above-mentioned processing routine of FIG. 10. Here, processings different from those in the above-mentioned processing routine of FIG. 10 will be described, and an explanation of the same or like processings will be omitted.

In the processing routine of FIG. 15, the ECU 8 carries out the processing of step S201, instead of the processing of step S106. In the processing of step S201, the ECU 8 derives the correction coefficient Cp3 corresponding to the pump discharge capacity, by accessing the above-mentioned map or function expression as shown in FIG. 13 using as an argument the pump discharge capacity obtained in the above-mentioned processing of step S105. When the processing of step S201 has been carried out, the ECU 8 carries out the processings of steps S107 and S108. Then, after having carried out the processing of step S108, the ECU 8 carries out the processings of steps S202 and S203, instead of the processings of steps S109 through S111.

In the processing of step S202, the ECU 8 calculates the post valve opening passage internal pressure Plwaft (=Plwbfr×Cp3) after correction by assigning, to the above-mentioned expression (4), the correction coefficient Cp3 decided in the above-mentioned processing of step S201 and the post valve opening passage internal pressure Plw after correction obtained in the above-mentioned processing of step S108 (corresponding to the post valve opening passage internal pressure Plwbfr before correction). The post valve opening passage internal pressure Plwaft after correction calculated in such a manner is a value which the post valve opening passage internal pressure can take when assuming that the pump discharge capacity is the same as the design value, as described in the above-mentioned explanation of FIG. 14. In other words, the post valve opening passage internal pressure Plwaft after correction calculated in the processing of step S202 is a value at which the variation in the post valve opening passage internal pressure resulting from the variation in the pump discharge capacity is rectified.

In the processing of step S203, the ECU 8 determines whether the post valve opening passage internal pressure Plwaft after correction calculated in the processing of step S202 is equal to or smaller than the predetermined threshold value Plwthre. As mentioned before, the "predetermined threshold value Plwthre" referred to herein is a value with which when the post valve opening passage internal pressure Plwaft after correction becomes larger than the predetermined threshold value Plwthre, it is estimated that the amount of the reducing agent to be actually added from the addition valve 3 becomes excessively smaller with respect to the desired target amount of addition, and hence it becomes difficult to reduce and purify (remove) the harmful gas components in the exhaust gas in an effective manner. The predetermined threshold value Plwthre is also a value which is decided by assuming the case where the pump discharge capacity is the same as the design value. In cases where an affirmative determination is made in the processing of the step S203 (Plwaft≤Plwthre), the routine of the ECU 8 goes to the processing of step S112, where a determination is made that the reducing agent adding device is normal. On the other hand, in cases where a negative determination is made in the processing of the step S203 (Plwaft>Plwthre), the routine of the ECU 8 goes to the processing of step S113, where a determination is made that the reducing agent adding device is abnormal.

As described above, when the abnormality diagnosis processing is carried out according to the processing routine of FIG. 15, the variation in the post valve opening passage internal pressure resulting from the variation in the pump discharge capacity is rectified, and the post valve opening passage internal pressure after correction is utilized as the diagnostic parameter, and hence, the decrease in diagnostic accuracy due to the variation in the pump discharge capacity is suppressed, whereby the occurrence of incorrect diagnosis is also suppressed.

<Third Modification of the First Embodiment>

In the above-mentioned first embodiment, reference has been made to an example in which the diagnostic parameter is corrected based on a difference between the actual pump discharge capacity of the pump 5 and the design value. In contrast to this, on the presumption that the pump discharge capacity of the pump 5 in its brand-new state is the same as the design value and the pump discharge capacity becomes gradually smaller from the design value as the time of use of the pump 5 becomes longer, the diagnostic parameter can also be corrected based on a difference between the pump discharge capacity of the pump 5 in a brand-new state and the pump discharge capacity of the pump 5 at the current point in time (i.e., an amount of decrease in the pump discharge capacity from the brand-new state). In that case, when the pump discharge capacity is equivalent to that at the time of the pump 5 being brand-new, the passage internal pressure decrease amount should not just be corrected. Then, when the pump discharge capacity is smaller than that at the time of the pump 5 being brand-new, correction should only be carried out in such a manner that the passage internal pressure decrease amount becomes large, and at the same time, an amount of correction should just be made larger as the amount of decrease in the pump discharge capacity from the brand-new state of the pump 5 becomes larger.

Second Embodiment

Next, reference will be made to a second embodiment of the present disclosure based on FIGS. 16 through 18. Here, a construction different from that of the above-mentioned first embodiment will be described, and an explanation of the same construction will be omitted. In the above-mentioned first embodiment, there has been described an example in which in the case of using the passage internal pressure decrease amount as the diagnostic parameter, the passage internal pressure decrease amount is corrected based on the pump discharge capacity of the pump 5, but in this second embodiment, reference will be made to an example of correcting the predetermined threshold value based on the pump discharge capacity of the pump 5.

<Method of Correcting the Predetermined Threshold Value>

In this second embodiment, the ECU 8 corrects the predetermined threshold value based on the following expression (5).

$$\Delta Pthreaft = \Delta Pthrebfr \times Cthre1 \quad (5)$$

In expression (5) above, $\Delta Pthreaft$ indicates a predetermined threshold value after correction; $\Delta Pthrebfr$ indicates a predetermined threshold value before correction; and $Cthre1$ indicates a correction coefficient based on the pump discharge capacity. The predetermined threshold value $\Delta Pthrebfr$ before correction referred to herein is a value decided by assuming the case where the pump discharge capacity is the same as the design value, and corresponds to the predetermined threshold value $\Delta Pthre$ in the above-mentioned first embodiment. In addition, as shown in FIG. 16, the correction coefficient $Cthre1$ referred to herein is set as a positive number, in such a manner that when the pump discharge capacity is equivalent to the design value, the correction coefficient $Cthre1$ becomes "1.0", and when the pump discharge capacity is larger than the design value, the larger the pump discharge capacity, the larger the correction coefficient $Cthre1$ becomes than "1.0", and on the other hand, when the pump discharge capacity is smaller than the design value, the smaller the pump discharge capacity, the smaller the correction coefficient $Cthre1$ becomes than "1.0". Here, note that the above-mentioned relation between the pump discharge capacity and the correction coefficient $Cthre1$ has been set in advance by adaptation work based on the result of experiments or simulations.

Here, note that although in an example shown in FIG. 16, the correction coefficient $Cthre1$ and the pump discharge capacity are in linear relation with each other, this is because the relation between the pump discharge capacity and the passage internal pressure decrease amount before correction becomes linear, as shown in the above-mentioned FIG. 9. Thus, in cases where the relation between the pump discharge capacity and the passage internal pressure decrease amount before correction becomes nonlinear, the correction coefficient $Cthre1$ should only be set so that the relation between the correction coefficient $Cthre1$ and the pump discharge capacity accordingly becomes nonlinear, too.

When the predetermined threshold value is corrected according to the correction coefficient $Cthre1$ and the expression (5) as mentioned above, as shown in FIG. 17, the predetermined threshold value $\Delta Pthrebfr$ before correction becomes a fixed value irrespective of the pump discharge capacity, but in contrast to this, the threshold value $\Delta Pthreaft$ after correction becomes a value larger in the case where the pump discharge capacity is large than in the case where the pump discharge capacity is small. Specifically, when the pump discharge capacity is the same as the design value, the predetermined threshold value $\Delta Pthreaft$ after correction becomes equivalent to the predetermined threshold value $\Delta Pthrebfr$ before correction. Then, in the case where the pump discharge capacity is larger than the design value, the larger the pump discharge capacity becomes than the design value, the larger the predetermined threshold value $\Delta Pthreaft$ after correction becomes than the predetermined threshold value $\Delta Pthrebfr$ before correction, but on the other hand, in the case where the pump discharge capacity is smaller than the design value, the smaller the pump discharge capacity becomes than the design value, the smaller the predetermined threshold value $\Delta Pthreaft$ after correction becomes than the predetermined threshold value $\Delta Pthrebfr$ before correction. Here, the passage internal pressure decrease amount tends to become larger in the case where the pump discharge capacity is large than in the case where the pump discharge capacity is small, as described in the above-mentioned first embodiment. Accordingly, the predetermined threshold value $\Delta Pthreaft$ corrected as shown in FIG. 17 becomes a value which takes account of the variation in the passage internal pressure decrease amount resulting from the variation in the pump discharge capacity. When the abnormality diagnosis processing is carried out by using such a predetermined threshold value ΔPthreaft after correction, even in cases where the pump discharge capacity has deviated from the design value, a decrease in diagnostic accuracy in the abnormality diagnosis processing can be suppressed, thus making it possible to suppress the occurrence of incorrect diagnosis.

<Abnormality Diagnosis Processing Flow>

In the following, an execution procedure of the abnormality diagnosis processing in this second embodiment will be described along with FIG. 18. FIG. 18 is a flow chart which shows a processing routine carried out by the ECU 8 at the time when the abnormality diagnosis processing according to this embodiment is performed. Here, note that in FIG. 18, the same reference signs are attached to the same processings as in the above-mentioned processing routine of FIG. 10. Here, processings different from those in the above-mentioned processing routine of FIG. 10 will be described, and an explanation of the same or like processings will be omitted.

In the processing routine of FIG. 18, the ECU 8 carries out the processing of step S301 instead of the processing of step S106, after having performed the processing of step S105. In the processing of step S301, the ECU 8 decides the above-mentioned correction coefficient Cthre1. Specifically, the ECU 8 derives the correction coefficient Cthre1 corresponding to the pump discharge capacity, by accessing the above-mentioned map or function expression as shown in FIG. 16 using as an argument the pump discharge capacity obtained in the processing of step S105. When the processing of step S301 has been carried out, the ECU 8 carries out the processings of steps S107 and S108. Then, after having carried out the processing of step S108, the ECU 8 carries out the processings of steps S302 through S304, instead of the processings of steps S109 through S111.

In the processing of step S302, the ECU 8 calculates the passage internal pressure decrease amount ΔP by subtracting from the predetermined pressure Pconst the post valve opening passage internal pressure Plw obtained in the above-mentioned processing of step S108 (ΔP=Pconst−Plw). The passage internal pressure decrease amount ΔP calculated in the processing of step S302 is a value corresponding to the passage internal pressure decrease amount ΔPbfr before correction in the above-mentioned first embodiment. Here, note that in this second embodiment, the ECU 8 carries out the processings of steps S108 and S302, thereby achieving the "diagnostic parameter obtaining unit" according to the present disclosure.

In the processing of step S303, the ECU 8 calculates the predetermined threshold value ΔPthreaft (=ΔPthrebfr× Cthre1) after correction by assigning the correction coefficient Cthre1 decided in the above-mentioned processing of step S301 to the above-mentioned expression (5). The predetermined threshold value ΔPthreaft after correction calculated in such a manner becomes equal to the predetermined threshold value ΔPthrebfr before correction, when the pump discharge capacity is the same as the design value, as described in the above-mentioned explanation of FIG. 17, but when the pump discharge capacity is larger than the design value, the predetermined threshold value ΔPthreaft after correction becomes a value larger than the predetermined threshold value ΔPthrebfr before correction, whereas when the pump discharge capacity is smaller than the design value, the predetermined threshold value ΔPthreaft after correction becomes a value smaller than the predetermined threshold value ΔPthrebfr before correction. In other words, the predetermined threshold value ΔPthreaft after correction calculated in the processing of step S303 becomes a value which takes account of the variation in the passage internal pressure decrease amount resulting from the variation in the pump discharge capacity.

Here, note that in this second embodiment, the ECU 8 carries out the above-mentioned processings of steps S301 and S303, thereby achieving the "correction unit" according to the present disclosure.

In the processing of step S304, the ECU 8 determines whether the reducing agent adding device is normal or not, by comparing the passage internal pressure decrease amount ΔP calculated in the above-mentioned processing of step S302 with the predetermined threshold value ΔPthreaft after correction calculated in the above-mentioned processing of step S303. Specifically, the ECU 8 determines whether the passage internal pressure decrease amount ΔP is equal to or more than the predetermined threshold value ΔPthreaft after correction. In cases where an affirmative determination is made in the processing of the step S304 (ΔP≤ΔPthreaft), the routine of the ECU 8 goes to the processing of step S112, where a determination is made that the reducing agent adding device is normal. On the other hand, in cases where a negative determination is made in the processing of the step S304 (ΔP<ΔPthreaft), the routine of the ECU 8 goes to the processing of step S113, where a determination is made that the reducing agent adding device is abnormal.

As described above, when the abnormality diagnosis processing is carried out according to the processing routine of FIG. 18, in cases where there occurs a variation in the passage internal pressure decrease amount resulting from the variation in the pump discharge capacity, such a variation will be taken into consideration for the predetermined threshold value. Then, by performing the abnormality diagnosis processing according to the method of making a comparison between the predetermined threshold value taking account of the above-mentioned variation, and the passage internal pressure decrease amount, the decrease in diagnostic accuracy clue to the variation in the pump discharge capacity is suppressed, thereby suppressing the occurrence of incorrect diagnosis, too.

<First Modification of the Second Embodiment>

In the above-mentioned second embodiment, reference has been made to an example of correcting the predetermined threshold value based on the pump discharge capacity of the pump 5, but the predetermined threshold value can also be corrected based on the pressure maintaining revolution number. In that case, the ECU 8 should only correct the passage internal pressure decrease amount based on the following expression (6).

$$\Delta Pthreaft = \Delta Pthrebfr \times Cthre2 \tag{6}$$

Cthre2 in expression (6) above indicates a correction coefficient based on the pressure maintaining revolution number. As shown in FIG. 19, the correction coefficient Cthre2 referred to herein is set as a positive value in such a manner that when the pressure maintaining revolution number is equal to a reference revolution number, Cthre2 becomes "1.0", and when the pressure maintaining revolution number becomes larger than the reference revolution number, the larger the pressure maintaining revolution number, the smaller Cthre2 becomes than "1.0", but on the other hand, when the pressure maintaining revolution number is smaller than the reference revolution number, the smaller the pressure maintaining revolution number, the larger Cthre2 becomes than "1.0". Here, note that the "reference revolution number" referred to herein is a value which the pressure maintaining revolution number can take when assuming the case where the pump discharge capacity is the same as the design value, as mentioned above.

Here, although in an example shown in FIG. 19, the correction coefficient Cthre2 and the pressure maintaining revolution number are in linear relation with each other, this is because the relation between the pressure maintaining revolution number and the passage internal pressure decrease amount before correction becomes linear, as shown in the above-mentioned FIG. 12. Thus, in cases where the relation between the pressure maintaining revolution number and the passage internal pressure decrease amount before correction becomes nonlinear, the correction coefficient Cthre2 should only be set so that the relation between the correction coefficient Cthre2 and the pressure maintaining revolution number accordingly becomes nonlinear.

When the predetermined threshold value is corrected according to the correction coefficient Cthre2 and the expression (6) as mentioned above, as shown in FIG. 20, the predetermined threshold value ΔPthrebfr before correction becomes a fixed value irrespective of the pressure maintaining revolution number, but in contrast to this, the threshold value ΔPthreaft after correction becomes a value smaller in the case where the pressure maintaining revolution number is large (i.e., in the case where the pump discharge capacity is small) than in the case where the pressure maintaining revolution number is small (i.e., in the case where the pump discharge capacity is large). Specifically, when the pressure maintaining revolution number is equivalent to the reference revolution number (i.e., when the pump discharge capacity is the same as the design value), the predetermined threshold value ΔPthreaft after correction becomes equivalent to the predetermined threshold value ΔPthrebfr before correction. Then, in the case where the pressure maintaining revolution number is smaller than the reference revolution number (i.e., the pump discharge capacity is larger than the design value), the smaller the pressure maintaining revolution number becomes than the reference revolution number, the larger the predetermined threshold value ΔPthreaft after correction becomes than the predetermined threshold value ΔPthrebfr before correction, but on the other hand, in the case where the pressure maintaining revolution number is larger than the reference revolution number (i.e., the pump discharge capacity is smaller than the design value), the larger the pressure maintaining revolution number becomes than the reference revolution number, the smaller the predetermined threshold value ΔPthreaft after correction becomes than the predetermined threshold value ΔPthrebfr before correction. Here, the passage internal pressure decrease amount tends to become smaller in the case where the pressure maintaining revolution number is large (i.e., in the case where the pump discharge capacity is small) than in the case where the pressure maintaining revolution number is small (i.e., in the case where the pump discharge capacity is large), as described in the above-mentioned first embodiment. Accordingly, the predetermined threshold value ΔPthreaft corrected as shown in FIG. 20 becomes a value which takes account of the variation in the passage internal pressure decrease amount resulting from the variation in the pump discharge capacity. When the abnormality diagnosis processing is carried out by using such a predetermined threshold value ΔPthreaft after correction, even in cases where the pump discharge capacity has deviated from the design value, a decrease in diagnostic accuracy in the abnormality diagnosis processing can be suppressed, thus making it possible to suppress the occurrence of incorrect diagnosis.

Here, note that the pressure maintaining revolution number correlates with the diagnostic voltage as mentioned above. For that reason, the predetermined threshold value can also be corrected by using the diagnostic voltage, instead of the pressure maintaining revolution number.

<Second Modification of the Second Embodiment>

In the second embodiment, reference has been made to an example in which the predetermined threshold value to be compared with the passage internal pressure decrease amount is corrected according to the pump discharge capacity in the case of using the passage internal pressure decrease amount as the diagnostic parameter, but in cases where the target value (the predetermined pressure) of the passage internal pressure at the time of adjusting the voltage to be applied to the pump 5 to the diagnostic voltage Vdiag in the state where the addition valve 3 is closed is set to a fixed value which has been decided in advance, the post valve opening passage internal pressure can also be used as the diagnostic parameter.

Here, the above-mentioned passage internal pressure decrease amount becomes larger in the case where the reducing agent adding device is normal than in the case where the reducing agent adding device is abnormal, as described in the above-mentioned first embodiment. Accordingly, in the above-mentioned construction in which the predetermined pressure is set to the fixed value, the above-mentioned passage internal pressure decrease amount becomes larger in the case where the reducing agent adding device is normal, in comparison with the case where it is abnormal, and accordingly, the post valve opening passage internal pressure becomes smaller. As a result of this, in the construction in which the predetermined pressure is set to the fixed value, in cases where the abnormality diagnosis processing is carried out by using the post valve opening passage internal pressure as the diagnostic parameter, when the post valve opening passage internal pressure is equal to or smaller than the predetermined threshold value, a determination should only be made that the reducing agent adding device is normal, but on the other hand, when the post valve opening passage internal pressure is larger than the predetermined threshold value, a determination should only be made that the reducing agent adding device is abnormal.

However, in cases where the abnormality diagnosis of the reducing agent adding device is carried out by using the post valve opening passage internal pressure as the diagnostic parameter, too, variation in the passage internal pressure decrease amount resulting from the variation in the pump discharge capacity of the pump 5 will occur, and accordingly, variation will occur in the post valve opening passage internal pressure, too. Thus, in cases where the abnormality diagnosis of the reducing agent adding device is carried out by using the post valve opening passage internal pressure as the diagnostic parameter, it is necessary to correct the predetermined threshold value according to the variation in the post valve opening passage internal pressure resulting from the pump discharge capacity of the pump 5.

<Method of Correcting the Post Valve Opening Passage Internal Pressure>

In the case where the abnormality diagnosis processing according to the above-mentioned method is carried out, the ECU 8 should only correct the predetermined threshold value based on the following expression (7).

$$Plwthreaft = Plwthrebfr \times Cthre3 \qquad (7)$$

In expression (7) above, Plwthreaft indicates a predetermined threshold value after correction; Plwthrebfr indicates a predetermined threshold value before correction; and Cthre3 indicates a correction coefficient based on the pump discharge capacity. As shown in FIG. 21, the correction coefficient Cthre3 referred to herein is set as a positive number, in such a manner that when the pump discharge capacity is equal to the design value, the correction coefficient Cthre3 becomes "1.0", and when the pump discharge capacity is larger than the design value, the larger the pump discharge capacity, the smaller the correction coefficient Cthre3 becomes than "1.0", and on the other hand, when the pump discharge capacity is smaller than the design value, the smaller the pump discharge capacity, the larger the correction coefficient Cthre3 becomes than "1.0". Here, note that the above-mentioned relation between the pump discharge capacity and the correction coefficient Cthre3 has been set in advance by adaptation work based on the result of experiments or simulations.

Here, note that although in an example shown in FIG. 21, the relation between the correction coefficient Cthre3 and the pump discharge capacity is linear, this is because the relation between the pump discharge capacity and the post valve opening passage internal pressure before correction becomes linear, as shown in the above-mentioned FIG. 14. Thus, in cases where the relation between the pump discharge capacity and the post valve opening passage internal pressure before correction becomes nonlinear, the correction coefficient Cthre3 should only be set so that the relation between the correction coefficient Cthre3 and the pump discharge capacity accordingly becomes nonlinear, too.

When the predetermined threshold value is corrected according to the correction coefficient Cthre3 and the expression (7) as mentioned above, as shown in FIG. 22, the predetermined threshold value Plwthrebfr before correction becomes a fixed value irrespective of the pump discharge capacity, but in contrast to this, the threshold value Plwthreaft after correction becomes a value smaller in the case where the pump discharge capacity is large than in the case where the pump discharge capacity is small. Specifically, when the pump discharge capacity is the same as the design value, the predetermined threshold value Plwthreaft after correction becomes equivalent to the predetermined threshold value Plwthrebfr before correction. Then, in the case where the pump discharge capacity is larger than the design value, the larger the pump discharge capacity becomes than the design value, the smaller the predetermined threshold value Plwthreaft after correction becomes than the predetermined threshold value Plwthrebfr before correction, but on the other hand, in the case where the pump discharge capacity is smaller than the design value, the smaller the pump discharge capacity becomes than the design value, the larger the predetermined threshold value Plwthreaft after correction becomes than the predetermined threshold value Plwthrebfr before correction. Here, the post valve opening passage internal pressure tends to become smaller in the case where the pump discharge capacity is large than in the case where the pump discharge capacity is small, as described in the above-mentioned second modification of the first embodiment. Accordingly, the predetermined threshold value Plwthreaft corrected as shown in FIG. 22 becomes a value which takes account of the variation in the post valve opening passage internal pressure resulting from the variation in the pump discharge capacity. When the abnormality diagnosis processing is carried out by using such a predetermined threshold value Plwthreaft after correction, even in cases where the pump discharge capacity has deviated from the design value, a decrease in diagnostic accuracy in the abnormality diagnosis processing can be suppressed, thus making it possible to suppress the occurrence of incorrect diagnosis. Here, note that the correction of the predetermined threshold value may be carried out based on the pressure maintaining revolution number, instead of of the pump discharge capacity. In that case, in cases where the pressure maintaining revolution number is larger than the reference revolution number (i.e., in cases where the pump discharge capacity is smaller than the design value), the correction should only be made in such a manner that the larger the pressure maintaining revolution number becomes than the reference revolution number, the predetermined threshold value Plwthreaft after correction becomes larger than the predetermined threshold value Plwthrebfr before correction, but on the other hand, in cases where the pressure maintaining revolution number is smaller than the reference revolution number (i.e., in cases where the pump discharge capacity is larger than the design value), the smaller the pressure maintaining revolution number becomes than the reference revolution number, the predetermined threshold value Plwthreaft after correction becomes smaller than the predetermined threshold value Plwthrebfr before correction.

<Abnormality Diagnosis Processing Flow>

In the following, an execution procedure of the abnormality diagnosis processing in this second modification will be described along with FIG. 23. FIG. 23 is a flow chart which shows a processing routine carried out by the ECU 8 at the time when the abnormality diagnosis processing according to this second modification is performed. Here, note that in FIG. 23, the same reference signs are attached to the same processings as in the above-mentioned processing routine of FIG. 18. Here, processings different from those in the above-mentioned processing routine of FIG. 18 will be described, and an explanation of the same or like processings will be omitted.

In the processing routine of FIG. 23, the ECU 8 carries out the processing of step S401, instead of the processing of step S301. In the processing of step S401, the ECU 8 derives the correction coefficient Cthre3 corresponding to the pump discharge capacity, by accessing the above-mentioned map or function expression as shown in FIG. 21 using as an argument the pump discharge capacity obtained in the above-mentioned processing of step S105. When the processing of step S401 has been carried out, the ECU 8 carries out the processings of steps S107 and S108. Then, after having carried out the processing of step S108, the ECU 8 carries out the processings of steps S402 and S403, instead of the processings of steps S302 through S304.

In the processing of step S402, the ECU 8 calculates the predetermined threshold value Plwthreaft (=Plwthrebfr× Cthre3) after correction by assigning the correction coefficient Cthre3 decided in the above-mentioned processing of step S401 to the above-mentioned expression (7). The predetermined threshold value Plwthreaft after correction calculated in such a manner becomes a value which takes account of the variation in the post valve opening passage internal pressure resulting from the variation in the pump discharge capacity, as described in the above-mentioned explanation of FIG. 22.

In the processing of step S403, the ECU 8 determines whether the post valve opening passage internal pressure Plw obtained in the above-mentioned processing of step S108 is equal to or smaller than the predetermined threshold value Plwthreaft after correction calculated in the above-mentioned processing of step S402. In cases where an affirmative determination is made in the processing of the step S403 (Plw≤Plwthreaft), the routine of the ECU 8 goes to the processing of step S112, where a determination is made that the reducing agent adding device is normal. On the other hand, in cases where a negative determination is made in the processing of the step S403 (Plw>Plwthreaft), the routine of the ECU 8 goes to the processing of step S113, where a determination is made that the reducing agent adding device is abnormal.

As described above, when the abnormality diagnosis processing is carried out according to the processing routine of FIG. 23, in cases where there occurs a variation in the post valve opening passage internal pressure resulting from the variation in the pump discharge capacity, such a variation will be taken into consideration for the predetermined threshold value. Then, by performing the abnormality diagnosis processing according to the method of making a comparison between the predetermined threshold value taking account of the above-mentioned variation, and the post valve opening passage internal pressure, the decrease in diagnostic accuracy due to the variation in the pump discharge capacity is suppressed, thereby suppressing the occurrence of incorrect diagnosis, too.

<Third Modification of the Second Embodiment>

In the above-mentioned second embodiment, reference has been made to an example in which the predetermined threshold value is corrected based on a difference between the actual pump discharge capacity of the pump 5 and the design value. In contrast to this, on the presumption that the pump discharge capacity of the pump 5 in its brand-new state is the same as the design value and the pump discharge capacity becomes gradually smaller from the design value as the time of use of the pump 5 becomes longer, the predetermined threshold value can also be corrected based on a difference between the pump discharge capacity of the pump 5 in a brand-new state and the pump discharge capacity of the pump 5 at the current point in time (i.e., an amount of decrease in the pump discharge capacity from the brand-new state). In that case, when the pump discharge capacity is equivalent to that at the time of the pump 5 being brand-new, the predetermined threshold value should not just be corrected. Then, when the pump discharge capacity is smaller than that at the time of the pump 5 being brand-new, correction should only be carried out in such a manner that the predetermined threshold value becomes small, and at the same time, an amount of correction should only be made larger as the amount of decrease in the pump discharge capacity from the brand-new state of the pump 5 becomes larger.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An abnormality diagnosis device applied to a reducing agent adding device comprising:
   an addition valve configured to add a reducing agent to an exhaust gas flowing through an exhaust passage of an internal combustion engine;
   an electric pump configured to pump up the reducing agent stored in a reducing agent tank;
   a reducing agent passage configured to introduce the reducing agent discharged from the pump to the addition valve;
   a pressure sensor configured to detect a pressure in the reducing agent passage; and
   a controller comprising at least one processor, the controller configured to:
   control a voltage to be applied to the pump to a diagnostic voltage which is a voltage at which the pressure detected by the pressure sensor becomes a predetermined pressure, in a state where the addition valve is closed;
   switch the addition valve from a valve closed state to a valve open state in a state where the voltage to be applied to the pump is maintained at the diagnostic voltage;
   obtain a diagnostic parameter, which is a parameter correlated with an amount of decrease in pressure in the reducing agent passage, based on the pressure detected by the pressure sensor after the addition valve is switched from the valve closed state to the valve open state;
   carry out an abnormality diagnosis of the reducing agent adding device by making a comparison between the diagnostic parameter and a predetermined threshold value;
   obtain a pump discharge capacity which is an amount of discharge per revolution of the pump; and
   correct either one of the obtained diagnostic parameter and the predetermined threshold value, based on the obtained pump discharge capacity,
   wherein the controller carries out the abnormality diagnosis of the reducing agent adding device by using the corrected diagnostic parameter or the corrected predetermined threshold value.

2. The abnormality diagnosis device for a reducing agent adding device according to claim 1, wherein
   the controller derives a revolution number parameter which is a parameter correlated with a pressure maintaining revolution number which is the number of revolutions per unit time of the pump at the time when the addition valve is in the valve closed state, and when the voltage to be applied to the pump is controlled at the diagnostic voltage, and obtains the pump discharge capacity of the pump based on the revolution number parameter and a correlation in which the pressure maintaining revolution number becomes smaller as the pump discharge capacity becomes larger.

3. The abnormality diagnosis device for a reducing agent adding device according to claim 2, wherein
   the controller obtains, as the revolution number parameter, the diagnostic voltage which is in a proportional relation with the pressure maintaining revolution number, and obtains the pump discharge capacity of the pump based on the diagnostic voltage and a correlation in which the diagnostic voltage becomes smaller as the pump discharge capacity becomes larger.

4. The abnormality diagnosis device for a reducing agent adding device according to claim 1, wherein
   the controller obtains, as the diagnostic parameter, a pressure decrease amount which is a difference between the pressure detected by the pressure sensor after the addition valve is switched from the valve closed state to the valve open state, and the predetermined pressure;
   when the pressure decrease amount is smaller than the predetermined threshold value, the controller determines that the reducing agent adding device is abnormal, and, when the pressure decrease amount is equal to or more than the predetermined threshold value, the controller determines that the reducing agent adding device is normal; and
   the controller corrects the obtained pressure decrease amount so as to be smaller, or corrects the predetermined threshold value so as to be larger, in the case where the obtained pump discharge capacity is large, in comparison with the case where the obtained pump discharge capacity is small.

5. The abnormality diagnosis device for a reducing agent adding device according to claim 2, wherein
the controller obtains, as the diagnostic parameter, a pressure decrease amount which is a difference between the pressure detected by the pressure sensor after the addition valve is switched from the valve closed state to the valve open state, and the predetermined pressure;
when the pressure decrease amount is smaller than the predetermined threshold value, the controller determines that the reducing agent adding device is abnormal, and, when the pressure decrease amount is equal to or more than the predetermined threshold value, the controller determines that the reducing agent adding device is normal; and
the controller corrects the obtained pressure decrease amount so as to be smaller, or corrects the predetermined threshold value so as to be larger, in the case where the obtained pump discharge capacity is large, in comparison with the case where the obtained pump discharge capacity is small.

6. The abnormality diagnosis device for a reducing agent adding device according to claim 3, wherein
the controller obtains, as the diagnostic parameter, a pressure decrease amount which is a difference between the pressure detected by the pressure sensor after the addition valve is switched from the valve closed state to the valve open state, and the predetermined pressure;
when the pressure decrease amount is smaller than the predetermined threshold value, the controller determines that the reducing agent adding device is abnormal, and, when the pressure decrease amount is equal to or more than the predetermined threshold value, the controller determines that the reducing agent adding device is normal; and
the controller corrects the obtained pressure decrease amount so as to be smaller, or corrects the predetermined threshold value so as to be larger, in the case where the obtained pump discharge capacity is large, in comparison with the case where the obtained pump discharge capacity is small.

7. The abnormality diagnosis device for a reducing agent adding device according to claim 1, wherein
in the case where the predetermined pressure is set to a fixed value which has been decided in advance, the controller obtains, as the diagnostic parameter, an absolute amount of the pressure detected by the pressure sensor after the addition valve is switched from the valve closed state to the valve open state;
when the absolute amount of the pressure is larger than the predetermined threshold value, the controller determines that the reducing agent adding device is abnormal, but on the other hand, when the absolute amount of the pressure is equal to or smaller than the predetermined threshold value, the controller determines that the reducing agent adding device is normal; and
the controller corrects the obtained absolute amount of the pressure so as to be larger, or corrects the predetermined threshold value so as to be smaller, in the case where the obtained pump discharge capacity is large, in comparison with the case where the obtained pump discharge capacity is small.

8. The abnormality diagnosis device for a reducing agent adding device according to claim 2, wherein
in the case where the predetermined pressure is set to a fixed value which has been decided in advance, the controller obtains, as the diagnostic parameter, an absolute amount of the pressure detected by the pressure sensor after the addition valve is switched from the valve closed state to the valve open state;
when the absolute amount of the pressure is larger than the predetermined threshold value, the controller determines that the reducing agent adding device is abnormal, but on the other hand, when the absolute amount of the pressure is equal to or smaller than the predetermined threshold value, the controller determines that the reducing agent adding device is normal; and
the controller corrects the obtained absolute amount of the pressure so as to be larger, or corrects the predetermined threshold value so as to be smaller, in the case where the obtained pump discharge capacity is large, in comparison with the case where the obtained pump discharge capacity is small.

9. The abnormality diagnosis device for a reducing agent adding device according to claim 3, wherein
in the case where the predetermined pressure is set to a fixed value which has been decided in advance, the controller obtains, as the diagnostic parameter, an absolute amount of the pressure detected by the pressure sensor after the addition valve is switched from the valve closed state to the valve open state;
when the absolute amount of the pressure is larger than the predetermined threshold value, the controller determines that the reducing agent adding device is abnormal, but on the other hand, when the absolute amount of the pressure is equal to or smaller than the predetermined threshold value, the controller determines that the reducing agent adding device is normal; and
the controller corrects the obtained absolute amount of the pressure so as to be larger, or corrects the predetermined threshold value so as to be smaller, in the case where the obtained pump discharge capacity is large, in comparison with the case where the obtained pump discharge capacity is small.

* * * * *